US010250351B2

United States Patent
Li et al.

(10) Patent No.: US 10,250,351 B2
(45) Date of Patent: Apr. 2, 2019

(54) EFFICIENT NETWORK UTILIZATION USING OPTICALLY SWITCHED SUPERCHANNELS

(71) Applicant: Futurewei Technologies, Inc., Plano, TX (US)

(72) Inventors: Guangzhi Li, Basking Ridge, NJ (US); Xiang Liu, Marlboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/729,152

(22) Filed: Oct. 10, 2017

(65) Prior Publication Data

US 2018/0102865 A1 Apr. 12, 2018

Related U.S. Application Data

(60) Provisional application No. 62/406,591, filed on Oct. 11, 2016.

(51) Int. Cl.

| H04B 10/40 | (2013.01) |
|---|---|
| H04B 10/50 | (2013.01) |
| H04B 10/60 | (2013.01) |
| H04J 14/02 | (2006.01) |
| H04Q 11/00 | (2006.01) |

(52) U.S. Cl.
CPC ...... *H04J 14/0212* (2013.01); *H04J 14/0257* (2013.01); *H04J 14/0267* (2013.01); *H04Q 11/0005* (2013.01); *H04B 10/40* (2013.01); *H04B 10/50* (2013.01); *H04B 10/60* (2013.01);

(Continued)

(58) Field of Classification Search
None
See application file for complete search history.

(56) References Cited

U.S. PATENT DOCUMENTS

| 2015/0215688 A1 | 7/2015 | Sambo et al. |
| 2015/0333863 A1 | 11/2015 | Fujita |

(Continued)

FOREIGN PATENT DOCUMENTS

| CN | 104469560 A | 3/2015 |
| WO | WO-2015/190328 A1 | 12/2015 |

OTHER PUBLICATIONS

"International Application Serial No. PCT/CN2017/105690, International Search Report and Written Opinion dated Dec. 29, 2017", 11 pgs.

(Continued)

*Primary Examiner* — Darren E Wolf
(74) *Attorney, Agent, or Firm* — Schwegman Lundberg & Woessner, P.A.

(57) ABSTRACT

A method for constructing an optical network includes connecting each of a plurality of nodes in an optical network to an optical switching central node via a set of optical superchannels, wherein each of the optical superchannels includes of a set of subchannels and has a bounded data rate, and wherein the optical switching central node is configured to perform wavelength selective optical switching among the superchannels on a subchannel basis without spectrum contention. Moreover, rearrangement (or "permutation") of the subchannels of the superchannels connected to the n sites may be performed to minimize the total spectral bandwidth used by the superchannels.

20 Claims, 17 Drawing Sheets

(52) U.S. Cl.
CPC ............. *H04Q 2011/0016* (2013.01); *H04Q 2011/0052* (2013.01)

(56) References Cited

U.S. PATENT DOCUMENTS

2017/0353264 A1* 12/2017 Rao .................... H04J 14/0212
2018/0076920 A1    3/2018 Li et al.

OTHER PUBLICATIONS

"Super-Channels: DWDM Transmission at 100Gb/s and Beyond", White Paper, © Copyright 2012 Infinera Corporation, (2015), 13 pgs.

Chandrasekhar, S., et al., "Transmission of a 1.2-Tb/s 24-Carrier No-Guard-Interval Coherent OFDM Superchannel over 7200-km of Ultra-Large-Area Fiber", *35th European Conference on Optical Communication*, Sep. 20-24, 2009, Vienna, Austria, (2009), 2 pgs.

Duffield, N. G., et al., "A Flexible Model for Resource Management in Virtual Private Networks", *ACM SIGCOMM '99*, (1999), 95-108.

Wei, Wei, et al., "Adaptive IP/Optical OFDM Networking Design", *2010 Conference on Optical Fiber Communication (OFC/NFOEC)*, Mar. 21-25, 2010, San Diego, CA, (2010), 3 pgs.

You, S., et al., "Seamless Sub-Band Wavelenght Conversion of Tb/s-Class CO-OFDM Superchannels", *IEEE Photonics Technology Letters*, 26(8), (2014), 801-804.

Zami, Thierry, et al., "Benefit of pure NxM WSS for optical multiflow application", *OFC/NFOEC Technical Digest, Optical Fiber Communication Conference 2013*, Mar. 17-21, 2013, Anaheim, CA, (2013), 3 pgs.

* cited by examiner

EFFICIENT NETWORK UTILIZATION USING OPTICALLY SWITCHED SUPERCHANNELS

RELATED APPLICATION

This application claims the benefit of U.S. Provisional Application Ser. No. 62/406,591, filed 11 Oct. 2016, which is incorporated herein by reference in its entirety.

FIELD OF THE INVENTION

The present disclosure is related to efficient optical network utilization and in particular to efficient network utilization using an all optical switching central node for switching optical superchannels.

BACKGROUND

In optical networks, signals may be transmitted at various wavelengths, with each wavelength corresponding to a transmission channel. Optical links may connect network nodes so that signals may be transmitted throughout the optical network. An optical path may use a series of network nodes and optical links to connect a source (e.g., a transmitter) of an optical transmission with a destination (e.g. a receiver) for the optical transmission.

With the advancements in technology, such as 5G mobility, 4K video, Internet of Things (IoT) communication and virtual reality (VR) games, new interactive applications will increasingly generate and consume enormous amounts of data. These large amounts of data in turn cause dramatic growth in network traffic, which requires larger bandwidth to minimize and reduce delays. In order to keep up with demands and ensure these that new technologies are economically efficient and operationally simple, an increase in the total capacity of existing optical networks is necessary such that providers may continue to expand their network bandwidth while limiting their infrastructure investment.

SUMMARY

This Summary is provided to introduce a selection of concepts in a simplified form that are further described below in the Detailed Description. This Summary is not intended to identify key features or essential features of the claimed subject matter. The claimed subject matter is not limited to implementations that solve any or all disadvantages noted in the Background.

A method for constructing an optical network includes connecting each of a plurality of nodes in an optical network to an all optical switching central node via a set of optical superchannels, wherein each of the optical superchannels includes of a set of subchannels and has a bounded data rate, and wherein the optical switching central node is configured to perform wavelength selective optical switching among the superchannels at the optical switching central node.

According to one aspect of the present disclosure, there is provided a method for constructing an optical network, the method comprising: connecting each of a plurality of nodes in an optical network to an all optical switching central node via a set of optical superchannels, wherein each of the optical superchannels includes of a set of wavelength subchannels and has a bounded data rate; and wherein the all optical switching central node is configured to perform wavelength selective switching among the subchannels of these superchannels at the all optical switching central node.

Optionally, in any of the preceding aspects, another implementation of the aspect provides that the connection between the all optical switching central node and each of the set of nodes is a flexible-grid wavelength-division multiplexing (WDM) connection.

Optionally, in any of the preceding aspects, a further implementation of the aspect provides that each of the superchannels include multiple wavelength subchannels with flexible spectrum assignment and modulation.

Optionally, in any of the preceding aspects, a further implementation of the aspect provides that each of the superchannels includes multiple wavelength subchannels having a same modulation format.

Optionally, in any of the preceding aspects, a further implementation of the aspect provides that the data rate of each of the superchannels is dynamically allocated to support communication among the plurality of nodes.

Optionally, in any of the preceding aspects, a further implementation of the aspect provides that the plurality of nodes of the optical network form a virtual private network (VPN).

Optionally, in any of the preceding aspects, a further implementation of the aspect provides that the all optical switching central node comprises multiple input and output optical fiber ports, coupled to an optical element that performs optical switching among the wavelength subchannels that are within each superchannel.

Optionally, in any of the preceding aspects, a further implementation of the aspect provides that the optical element comprises a flexible-grid wavelength selective switch.

Optionally, in any of the preceding aspects, a further implementation of the aspect provides that the set of superchannels are given spectral assignments on a subchannel basis according to a coding assignment scheme such that the wavelength selective switching among the subchannels of these superchannels is achieved without spectrum contention.

Optionally, in any of the preceding aspects, a further implementation of the aspect provides that the coding assignment scheme also minimizes the total superchannel bandwidth, $B_{total}$.

Optionally, in any of the preceding aspects, a further implementation of the aspect provides that the total superchannel bandwidth, $B_{total}$, is defined as $B_{total}$=sum of y[j], where y[j] is the bandwidth of the $j^{th}$ subchannel that is defined as $$y[j]=\max(m(0,j),m(1,j+1),\ldots,m(n,(j+n) \% n),$$
$$j=0,\ldots,n-1,$$

for a star-type network having n sites, V0, ..., Vn−1 with traffic matrix M=[m(i,j)] traffic from Vi to Vj.

Optionally, in any of the preceding aspects, a further implementation of the aspect provides that at a transmitter side, m(k,j) data rate is assigned to slot y[(j−k) % n], and at a receiver side, m(j,k) data rate is assigned to slot y[(k−j) % n] where k is a site index and "%" means the remaining after divided by n.

Optionally, in any of the preceding aspects, a further implementation of the aspect provides that rearrangement as a permutation of the subchannels of the superchannels connected to the n sites is performed to minimize $B_{total}$.

Optionally, in any of the preceding aspects, a further implementation of the aspect provides that optimized permutation of nodes from all permutations of the nodes to minimize $B_{total}$ is obtained by using a heuristic algorithm.

Optionally, in any of the preceding aspects, a further implementation of the aspect provides that the heuristic algorithm comprises: finding a largest bandwidth utilization matrix and placing the largest bandwidth utilization matrix in a first position of a position order; finding a largest remaining destination traffic node from the last found node and placing the largest remaining destination traffic node in a next position; and finding the largest remaining destination traffic node from the last found node and placing it an end of the position order until all nodes are placed.

Optionally, in any of the preceding aspects, a further implementation of the aspect provides that optimized permutation of nodes from all permutations of the nodes to minimize $B_{total}$ is obtained by using an integer linear programming algorithm.

Optionally, in any of the preceding aspects, a further implementation of the aspect provides that the integer linear programming algorithm comprises: obtaining n sites with traffic matrix and variables $X[k,i]=1$ if k site is in position of i, else 0, and $Y[j]$ being a maximal bandwidth for $j^{th}$ subchannel; performing an objective function to find the permutation with minimum total bandwidth utilization: Min $\Sigma_j Y[j]$ where $j=0, \ldots, n-1$, subject to constraints comprising: $\Sigma_k x[k,l]=1$, $\Sigma_i x[k,l]=1$, and $Y[j] \geq \Sigma_k m[i,k]*x[k,(j+i) \% n]$, $i=0, \ldots, n-1$ where k is a site index and "%" means the remaining after divided by n; summing the maximum bandwidth utilization for each subchannel subject to the constraints; and selecting the permutation with the minimum total bandwidth utilization.

Optionally, in any of the preceding aspects, a further implementation of the aspect provides that the rearrangement as a permutation of the subchannels of the superchannels connected to the n sites is achieved by changing forwarding tables to reflect the selected permutation.

Optionally, in any of the preceding aspects, a further implementation of the aspect provides that the all optical switching central node connects at least another plurality of nodes of the optical network via at least another set of superchannels having another data rate.

Optionally, in any of the preceding aspects, a further implementation of the aspect provides that multiple sets of the superchannels are assigned spectrum according to a coding assignment scheme such that wavelength switching without spectrum contention is achieved.

According to one aspect of the present disclosure, there is provided a non-transitory computer-readable medium that stores computer instructions for constructing an optical network, that when executed by one or more processors, causes the one or more processors to perform the steps of: connecting each of a plurality of nodes in an optical network to an all optical switching central node via a set of optical superchannels, wherein each of the optical superchannels includes of a set of subchannels and has a bounded data rate; and wherein the all optical switching central node is configured to perform wavelength selective optical switching among the superchannels at the all optical switching central node.

Optionally, in any of the preceding aspects, another implementation of the aspect provides that the set of superchannels are given spectral assignments on a subchannel basis according to a coding assignment scheme such that the wavelength selective switching among the subchannels of these superchannels is achieved without spectrum contention.

Optionally, in any of the preceding aspects, a further implementation of the aspect provides that the coding assignment scheme also minimizes the total superchannel bandwidth, $B_{total}$.

Optionally, in any of the preceding aspects, a further implementation of the aspect provides that the non-transitory computer-readable medium storing computer instructions for constructing an optical network that when executed by one or more processors, causes the one or more processors to perform any of and any combination of the steps identified above with respect to aspects of the present disclosure in which a method for constructing an optical network is provided.

According to one aspect of the present disclosure, there is provided an optical communication network comprising: a plurality of nodes connected to optical links; and an all optical switching central node among a plurality of nodes in the optical communication network; wherein a set of nodes from the plurality of nodes is coupled to the all optical switching central node via a corresponding set of superchannels, wherein each of the superchannels includes a set of wavelength separated subchannels and wherein the all optical switching central node is configured to perform wavelength selective switching among the superchannels on a subchannel basis.

Optionally, in any of the preceding aspects, another implementation of the aspect provides that the wavelength separated subchannels are coupled via the all optical switching central node based on a minimization of total superchannel bandwidth utilization.

Optionally, in any of the preceding aspects, a further implementation of the aspect provides that the connection between the all optical switching central node and each of the set of nodes is a flexible-grid WDM connection.

Optionally, in any of the preceding aspects, a further implementation of the aspect provides that each of the superchannels includes multiple wavelength subchannels with flexible spectrum assignment and modulation.

Optionally, in any of the preceding aspects, a further implementation of the aspect provides that each of the superchannels includes multiple wavelength subchannels having a same modulation format.

Optionally, in any of the preceding aspects, a further implementation of the aspect provides that the plurality of nodes of the optical network form a virtual private network (VPN).

Optionally, in any of the preceding aspects, a further implementation of the aspect provides that the all optical switching central node comprises multiple input and output optical fiber ports, coupled to an optical element that performs optical switching among the wavelength subchannels that are within each superchannel.

Optionally, in any of the preceding aspects, a further implementation of the aspect provides that the optical element comprises a flexible-grid wavelength selective switch.

Optionally, in any of the preceding aspects, a further implementation of the aspect provides that multiple sets of the superchannels are assigned spectrum according to a coding assignment scheme such that wavelength switching without spectrum contention is achieved.

Optionally, in any of the preceding aspects, a further implementation of the aspect provides that each of the superchannels has a bounded data rate.

Optionally, in any of the preceding aspects, a further implementation of the aspect provides that the data rate of each of the superchannels is dynamically allocated to support communication among the plurality of nodes.

Optionally, in any of the preceding aspects, a further implementation of the aspect provides that the set of superchannels are given spectral assignments on a subchannel basis according to a coding assignment scheme such that the wavelength selective switching among the subchannels of these superchannels is achieved without spectrum contention.

Optionally, in any of the preceding aspects, a further implementation of the aspect provides that the coding assignment scheme also minimizes the total superchannel bandwidth, $B_{total}$.

Optionally, in any of the preceding aspects, a further implementation of the aspect provides that the total superchannel bandwidth, $B_{total}$, is defined as $B_{total}$=sum of y[j], where y[j] is the bandwidth of the $j^{th}$ subchannel that is defined as $$y[j]=\max(m(0,j),m(1,j+1), \ldots ,m(n,(j+n) \% n),$$
$$j=0, \ldots ,n-1,$$

for a star-type network having n sites, V0, ..., Vn−1 with traffic matrix M=[m(i,j)] traffic from Vi to Vj.

Optionally, in any of the preceding aspects, a further implementation of the aspect provides that at a transmitter side, m(k,j) data rate is assigned to slot y[(j−k) % n], and at a receiver side, m(j,k) data rate is assigned to slot y[(k−j) % n] where k is a site index and "%" means the remaining after divided by n.

Optionally, in any of the preceding aspects, a further implementation of the aspect provides that rearrangement as a permutation of the subchannels of the superchannels connected to the n sites is performed to minimize $B_{total}$.

Optionally, in any of the preceding aspects, a further implementation of the aspect provides that optimized permutation of nodes from all permutations of the nodes to minimize $B_{total}$ is obtained by using a heuristic algorithm.

Optionally, in any of the preceding aspects, a further implementation of the aspect provides that the heuristic algorithm comprises: finding a largest bandwidth utilization matrix and placing the largest bandwidth utilization matrix in a first position of a position order; finding a largest remaining destination traffic node from the last found node and placing the largest remaining destination traffic node in a next position; and finding the largest remaining destination traffic node from the last found node and placing it an end of the position order until all nodes are placed.

Optionally, in any of the preceding aspects, a further implementation of the aspect provides that optimized permutation of nodes from all permutations of the nodes to minimize $B_{total}$ is obtained by using an integer linear programming algorithm.

Optionally, in any of the preceding aspects, a further implementation of the aspect provides that the integer linear programming algorithm comprises: obtaining n sites with traffic matrix and variables X[k,i]=1 if k site is in position of i, else 0, and Y[j] being a maximal bandwidth for $j^{th}$ subchannel; performing an objective function to find the permutation with minimum total bandwidth utilization: Min $\Sigma_j Y[j]$ where j=0, ..., n−1, subject to constraints comprising: $\Sigma_k x[k,l]=1$, $\Sigma_i x[k,l]=1$, and $Y[j] \geq \Sigma_k m[i,k]*x[k,(j+i) \% n]$, i=0, ..., n−1 where k is a site index and "%" means the remaining after divided by n; summing the maximum bandwidth utilization for each subchannel subject to the constraints; and selecting the permutation with the minimum total bandwidth utilization.

Optionally, in any of the preceding aspects, a further implementation of the aspect provides that the rearrangement as a permutation of the subchannels of the superchannels connected to the n sites is achieved by changing forwarding tables to reflect the selected permutation.

Optionally, in any of the preceding aspects, a further implementation of the aspect provides that the all optical switching central node connects at least another plurality of nodes of the optical network via at least another set of superchannels having another data rate.

DETAILED DESCRIPTION

Figure 1:
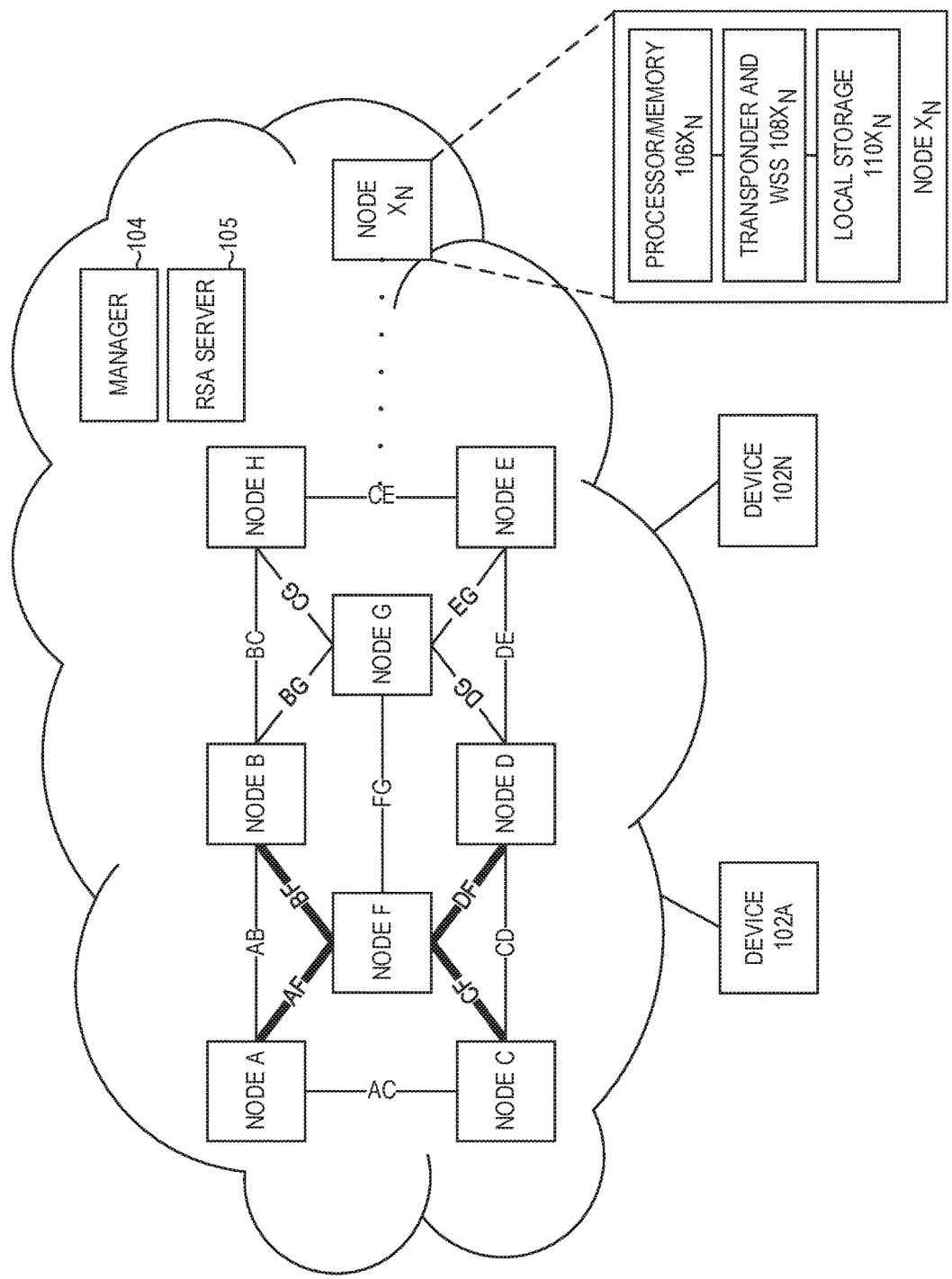
FIG. 1 illustrates an example network environment in accordance with the disclosed technology.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The disclosure relates to technology for selection of an all optical switching central or hub node in an optical network having superchannel connections with wavelength selective switching capability. An optical communication network typically includes a transmitter, which encodes a message into an optical signal, an optical channel, which carriers the optical signal to its destination, and a receiver, which reproduces the message from the received optical signal. An optical channel is a wavelength path, where an optical signal in the wavelength path can include a message being communicated. A superchannel is a type of optical channel, which can include a collection of continuous optical channels, called subchannels from the same source, with the same destination, and along the same path. An optical superchannel can be implemented as an optical channel in which multiple, coherent optical carriers are combined to create a unified channel of a higher data rate, which is provided in service in a single operational cycle. An optical signal can be carried in an optical channel of the superchannel, which may be referred to as an optical signal inside a superchannel.

In various embodiments, a superchannnel can be terminated at an optical switch instead of conventional electrical switch, such that the subchannels of one superchannel can be switched into another superchannel. For example, a path from a source to the optical switch can be one superchannel, and a path from the optical switch to a destination can be another superchannel. Inside each of these superchannels, the subchannels are paths with the same source, destination, and path. In such embodiments, subchannels can be repacked at the optical switch and arranged into another superchannel. Such architectures, providing optimized packing of subchannels into a superchannel and repacking of the subchannels into a next superchannel such that there is no wavelength contention/confliction, provide efficiencies over conventional implementation of superchannels of point-to-point application only from a source generating a message on an optical signal to a destination to receive the message from the optical signal.

Prior implementations of optical networks with superchannel connections utilized electronic switching at a central node. While electronic switching is good and efficient, it is expensive in some applications as it requires both an optical layer and an electronic switching layer. The use of all optical switching at a central node or hub avoids electronic switching, resulting in a lower implementation cost. The use of such all optical switching may improve spectrum efficiency and allows for two-hop routing to simplify operations. Network capital expenditure (CAPEX) and network operational expenditure (OPEX) may be significantly reduced.

An optical network is constructed by selecting an all optical switching central node among other nodes in the optical network. Each of the nodes is connected to the all optical switching central node via a set of superchannels, where each of the superchannels has a bounded data rate. Wavelength selective switching may then be performed among the superchannels at the central node.

Network resources between the central node and each of the other network nodes are managed by dynamically allocating bandwidth to support communication among the other network nodes via the superchannels.

FIG. 1 illustrates an example network environment in accordance with the disclosed technology. The network is, for example, an optical communication network 100 capable of bandwidth variable wavelength switching. The optical communication network 100 includes, for example, multiple nodes (such as node A to node $X_N$, collectively nodes $X_N$), a manager 104 and connected devices 102A to 102N.

Optical communication network 100 may be implemented using various topologies (e.g., star, ring, mesh, etc.). Each of the nodes $X_N$ is a point in optical communication network 100. For example, node A may be an optical regeneration node, an optical transmitting/receiving node, or an optical switching node. Node A may be implemented, for example, as a dense wavelength division multiplexing (DWDM) system.

An exploded view of node $X_N$ shows that each node includes a processor/memory $106X_N$ having an interface configured to receive a traffic request of x subchannels of a superchannel (superchannels are described below in more detail with reference to FIG. 4). The node has transponders and bandwidth variable wavelength selective switches (WSSs) $108X_N$ configured to implement superchannels having subchannels. The transponders and WSS $108X_N$ are controlled by the processor/memory $106X_N$ which are configured to respond to the new traffic request starting a routing procedure. The node has local storage 110 $X_N$.

An external routing and spectrum assignment (RSA) server 105 (which may also be internal to a node) includes a processor and memory (not shown) which may execute RSA algorithms as well as store network topologies, subcarrier availability and spectrum availability. RSA server 105 may also be coupled to the nodes $X_N$ of the optical communication network 100 via an interface.

Each of the nodes $X_N$ may be connected with optical links, such as optical links AB, BC, CE, DE, CD, AC, AF, BF, CF, DF, FG, DG, EG, BG and CG. An optical link may be an optical fiber, an optical channel, an optical super-channel, a super-channel group, an optical carrier group, a set of spectral slices, an optical control channel, an optical data channel, and/or any other optical signal transmission link that communicatively couples one node $X_{N1}$ to another node $X_{N2}$.

In one embodiment, an optical link may be an optical superchannel that includes multiple channels multiplexed together using wavelength-division multiplexing (WDM) or DWDM in order to increase transmission capacity. Various quantities of channels may be combined into superchannels using various modulation formats to create different superchannel types having different characteristics. Additionally, or alternatively, an optical link may be a superchannel group.

A super-channel group may include multiple superchannels multiplexed together using WDM or DWDM in order to increase transmission capacity.

Devices 102A to 102N may communicate with the optical communication network 100. The devices 102A to 102B may include, for example, a portable device, a handheld device, a mobile device, a stationary device, a vehicle-based device, or some other type of user device. Additionally, or alternatively, devices 102A to 102N may correspond to a non-user device, such as, a meter, a sensor, or some other device that is capable of machine-to-machine (M2M) communication.

Manager 104 manages the configuration of optical communication network 100 and enables administrators to monitor, configure, etc., the optical communication network 100. Manager 100 may identify network state information, resource availability and resource allocation, and/or other parameters relating to optical communication network 100. Manager 100 may be implemented in a centralized or a distributed fashion.

As appreciated, the depicted embodiments are non-limiting and any number of devices, nodes and/or optical links may exist in the optical communication network.

Figure 2:
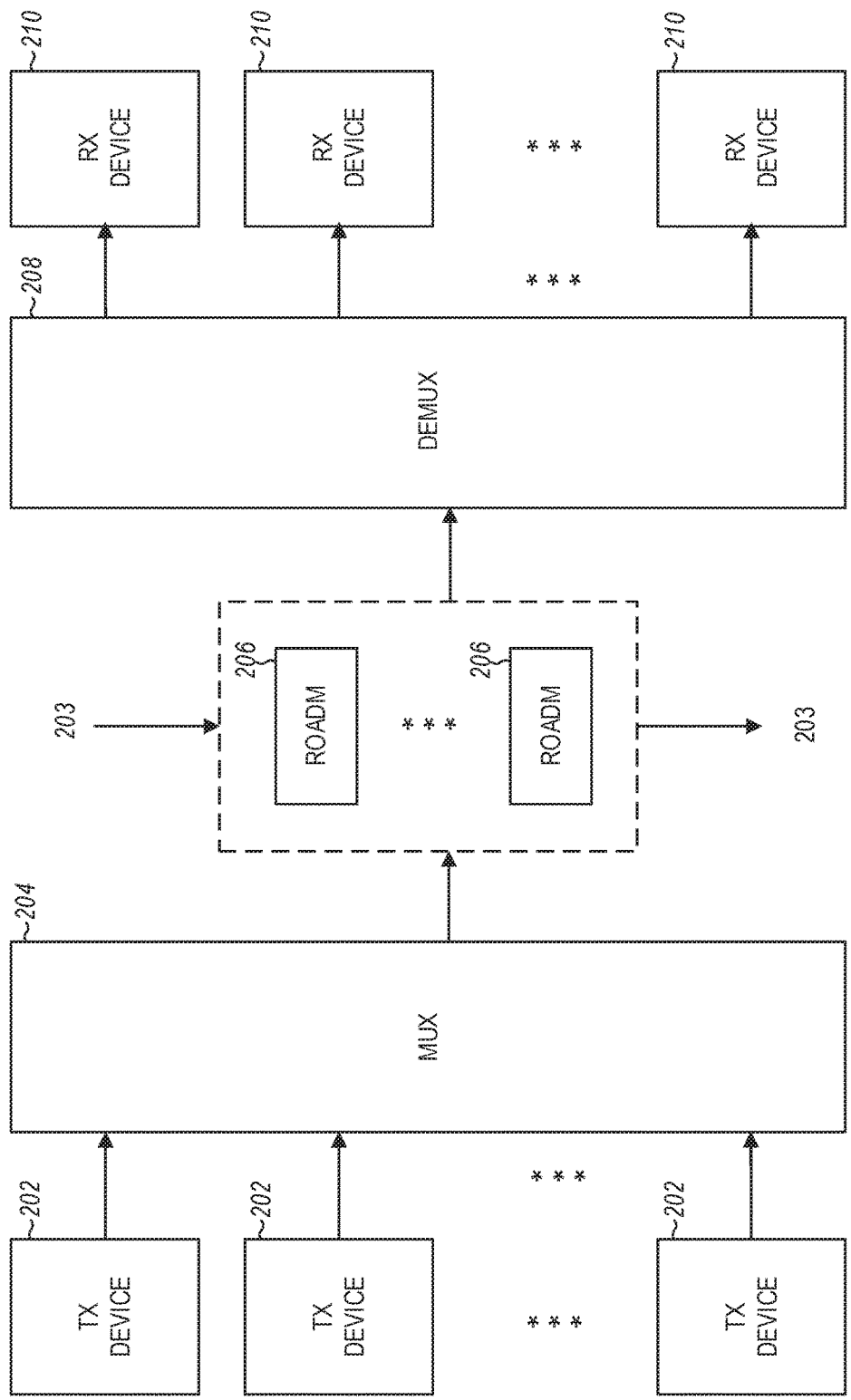
FIG. 2 illustrates example devices and components of the optical communication network in FIG. 1.

FIG. 2 illustrates example devices and components of the optical communication network in FIG. 1. One or more devices may operate within optical communication network 100 (FIG. 1) and may correspond to one or more network devices 102N and/or one or more optical components of a network device 102N. As illustrated, the optical communication network devices and components may include a set of transmitter devices 202, one or more superchannels 203, a multiplexer 204, one or more reconfigurable optical add-drop multiplexers (ROADMs) 206, a demultiplexer 208 and one or more receiver devices 210. A service generates optical signal in a wavelength through transmitter, then those wavelengths are muxed together and travel through one or more superchannels; at a destination, the optical network will demux the optical signal into different wavelengths; and each receiver will receive one wavelength and convert it into electrical signal for service.

Each of the one or more superchannels 203 can be arranged with a ROADM 206 in its path. Each of the one or more superchannels 203 can be in optical fibers to or from the ROADM 206 in its path. In some instances, a superchannel 203 incident to a ROADM 206 passes through ROADM 206. In some instances, optical signals from the set of transmitter devices 202 can be combined using mux 204 and processed into a superchannel with one of the ROADMs 206 as a part of a source for a superchannel 203 effectively beginning with an output from the respective ROADM 206, where ROADM is configured as an optical switch or containing an optical switch. In some instances, one of the ROADMs 206 may be a destination for a superchannel 203, where output from such a ROADM 206 can be provided to demux 208, which sends optical signals to the appropriate receiver devices 210, which demultiplexing can be based on wavelength of the optical signals from the superchannel 203 arranged to connected to an input of the respective ROADM 206. With at least one of the one or more ROADMs 206 having an all optical switch, an optical network can be constructed including connecting each of a plurality of nodes in an optical network to the all optical switch as an all optical switching central node via a set of optical superchannels, where each of the optical superchannels can include a set of wavelength subchannels and can have a bounded data rate. The all optical switching central node can be configured to perform wavelength selective switching among the subchannels of these superchannels at the all optical switching central node. Such an architecture can be implemented to optimally switch subchannels in superchannels using the optical switch.

Transmitter devices 202 may include, for example, an optical transmitter and/or an optical transceiver that generates an optical signal. In one embodiment, transmitter devices 202 may include a laser associated with each wavelength, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). A set of optical signals, where the set can include one or more optical signals, may be carried in a set of continuous subchannels, which form a superchannel 203, or one or more optical signals may be carried in a single superchannel 203. In another embodiment, a single transmitter device 202 may be associated with one or more single superchannels 203. In still another embodiment, multiple transmitter devices 202 may be associated with a single superchannel 203. The transmitter devices may also include a multiplexer (MUX) 204 (which is illustrated separately).

MUX 204 may include, for example, an optical multiplexer (e.g., a power multiplexer, a WSS-based multiplexer, a multi-cast multiplexer, etc.) that combines multiple input superchannels 203 for transmission via an output fiber.

DEMUX 208 may include, for example, an optical demultiplexer (e.g., a power demultiplexer, a WSS-based demultiplexer, etc.) that separates multiple superchannels 203 carried over an input fiber. For example, demultiplexer 208 may separate superchannels 203 and may provide each superchannel 203 to a corresponding receiver device 210.

Receiver devices 210 may include, for example, an optical receiver and/or an optical transceiver that receives an optical signal. In one embodiment, receiver devices 210 may be integrated with DEMUX 208. One or more optical signals may be received by the receiver devices 210 via superchannel 203. Receiver device 210 may convert an optical signal into an electrical signal, which may be processed to output information associated with each data stream carried by an optical channel included in superchannel 203. Similar to the transmitter devices 202, a single receiver device 210 may be associated with one or more superchannels 203 or multiple receiver devices 210 may be associated with a single superchannel 203.

As wavelength channels evolve from single carrier (e.g., 100 Gbps) to multicarrier superchannels (e.g., 500 Gbps), each subchannel may carry 25G or more data rates. Once a superchannel has been formed, it becomes most cost-effective for that superchannel to optically pass through intermediate ROADMs and terminate only at its end point, which may include a ROADM, where subchannels will be extracted and switched in electronic switch of coarse granularity, e.g. 25 Gbps. In this regard, ROADMs enable superchannels to be easily switched and reconfigured to minimize optical switch cost, while coarse granularity electronic switching maximizes bandwidth efficiency and operation flexibility.

To maximize efficiency, the optical communication network 100 (i.e., flexible grid optical communication network) may deploy network nodes that support multilayer switching, including optical superchannel switches and all optical subchannel switches. However, not all ROADMs 206 require subchannel switches. Rather, as described below, utilizing a dependence graph of a flexible grid network with link distances and superchannels, an optimal number of ROADMs 206 with optical subchannel switches may be employed such that between any two nodes there is a superchannel path. In one embodiment, a flexible-grid means that channel bandwidth allocated to a superchannel can be flexible.

As appreciated, the number and arrangement of devices illustrated are non-limiting and examples. There may be additional devices, fewer devices, different devices, or differently arranged devices.

Figure 3A:
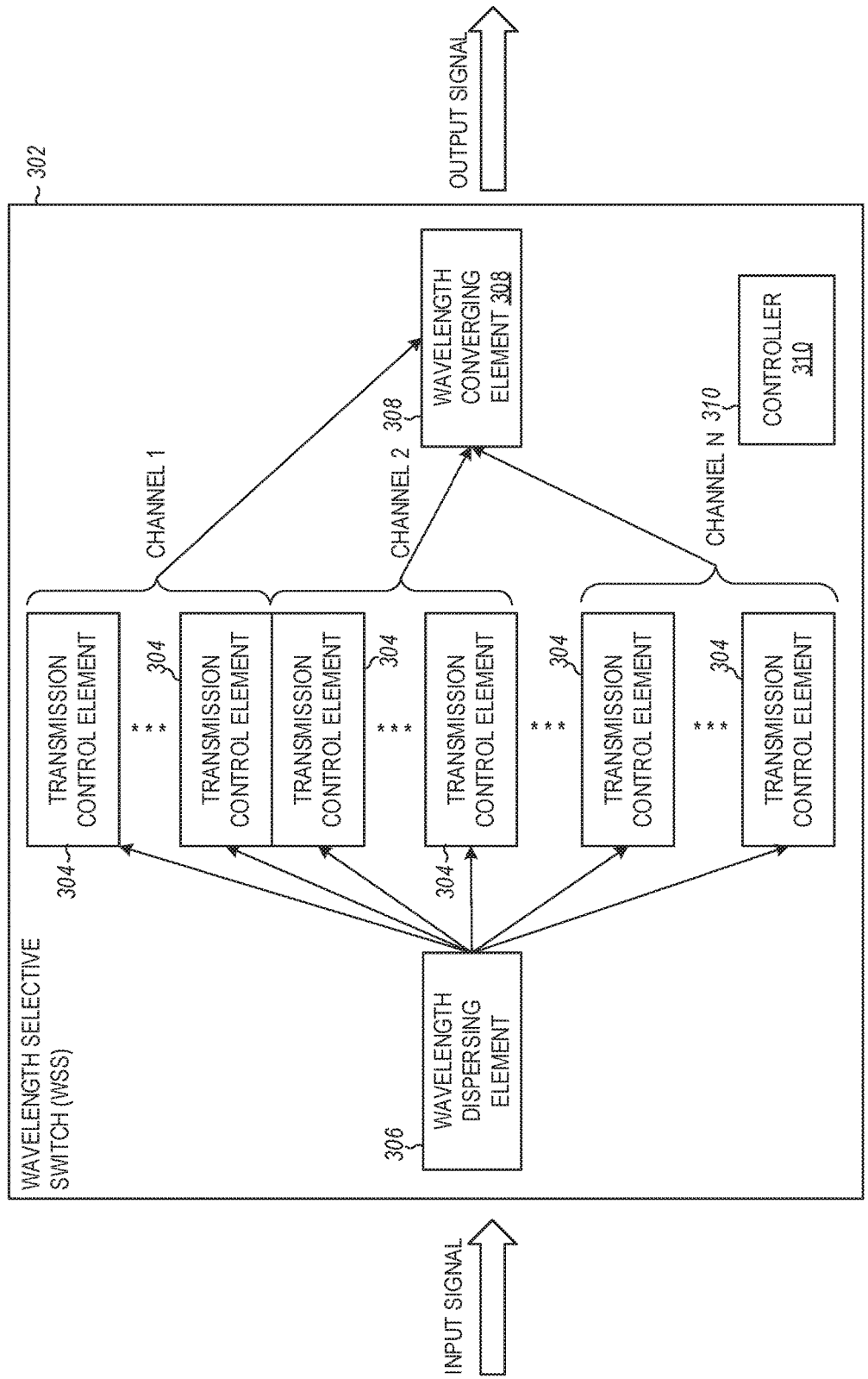
FIG. 3A is a block diagram of example elements of a wavelength selective switch that can be implemented in an optical communication network of disclosed embodiments.

FIG. 3A is a block diagram of example elements of a WSS that can be implemented in an optical communication network of the disclosed embodiments. A wavelength selective switch 302 can provide an optical cross-connect function with single channel granularity. Any WDM or DWDM channel from any of N inputs can be routed to any of a number of outputs. Wavelength selective switch 302 can allow any wavelength from an input optical fiber to be mapped to any output optical fiber. Although a single WSS is depicted, it is appreciated that one or more WSSs may be employed in a network. The WSS may be internal to a particular node or external to a node in the network.

WSS 302 can include, for example, a wavelength dispersing element 306, a wavelength converging element 308, transmission control elements 304, and a controller 310. A wavelength dispersing element is, in general, an element that disperses an optical signal that is incident to the element into optical outputs in different directions. The direction can be selected to provide the optical signal to one or more entities, which can individually process the optical signal including selectively passing on the optical signal. In some instances, the direction can be selected based on wavelength. A wavelength converging element is, in general, an element that converges optical signals incident to the element into an optical output in a selected direction. A transmission control element, as taught herein, is an element that can control parameters of an associated optical signal, such as, but not limited to, controlling further propagation of the optical signal. Optical output from wavelength dispersing element 306 can be operated on by the transmission control elements 304 to divide the optical signal that is input to wavelength dispersing element 306 into channel 1, channel 2 . . . channel N. Control of which optical signal is assigned to which channel, or cut off, can be provided by a controller 310 that manages the transmission control elements 304. Optical signals assigned to channel 1, channel 2 . . . channel N by the transmission control elements 304 can be directed to wavelength converging element 308 to provide an output signal. For convenience, one wavelength converging element 308 is shown. WSS 302 can include a number of wavelength converging elements 308 that each provides an output signal. The controller 310 can include algorithms to assign optical signals from a channel input to WSS 302 to a channel output from WSS 302. The WSS 302 can be structured such that the input to WSS 302 can be a superchannel and the output from WSS 302 can be a superchannel.

Figure 3B:
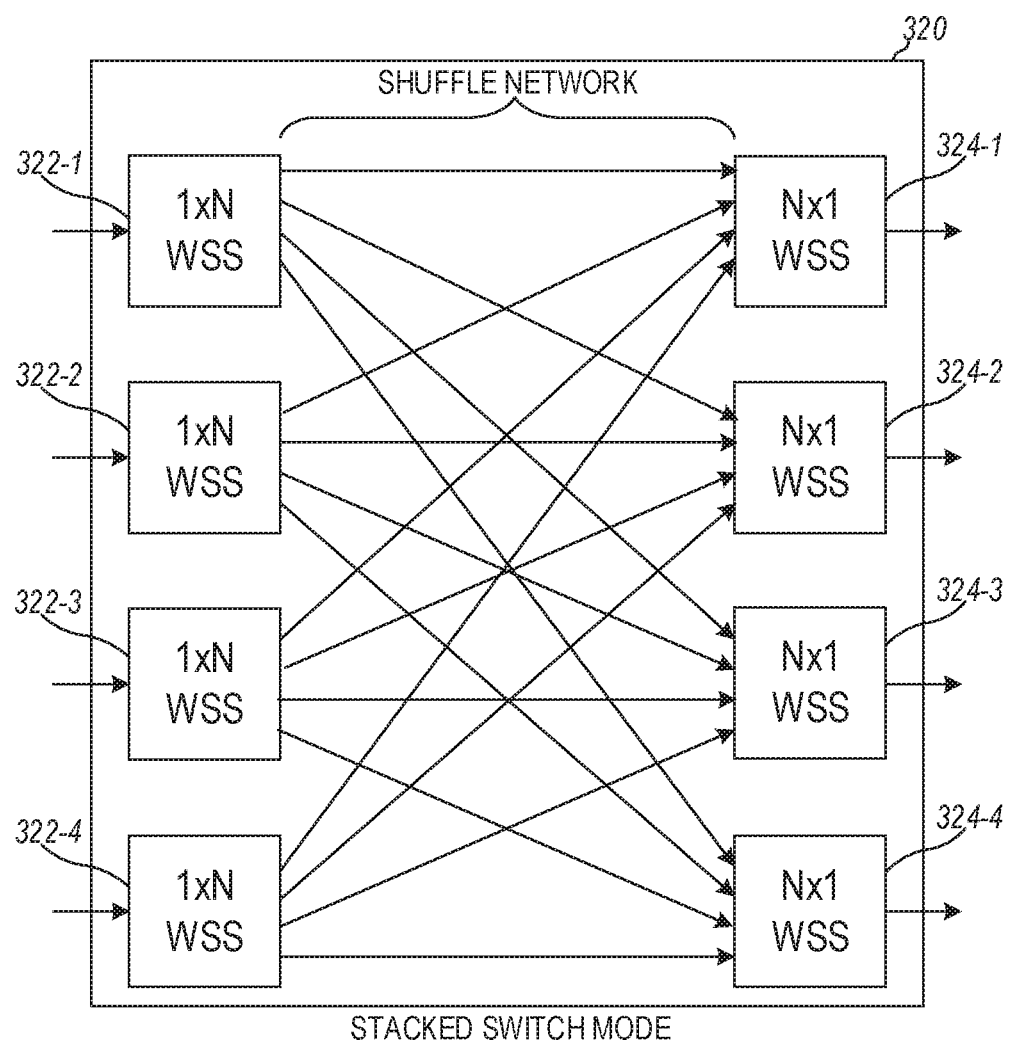
FIG. 3B is a block diagram of a stacked switch module that can be implemented in an optical network of disclosed embodiments.

FIG. 3B is a block diagram of a stacked switch module 320 that can be implemented in an optical network. Stacked switch module 320 can include a number of individual WSSs 322-1, . . . 322-4 at an input of the stacked switch module 320 and a number of individual WSSs 324-1, . . . 324-4 at an output of the stacked switch module 320. Though FIG. 3B shows four WSSs at the input of stacked switch module 320 and four WSSs at the input of stacked switch module 320, stacked switch module 320 can include more or less than four WSSs at its input and at its output. Stacked switch module 320 can be arranged as an optical switch with N fiber ports, where all input subchannel signals can be reshuffled and repacked into other fibers without wavelength contention. Optical signals in superchannels to WSSs 322-1, . . . 322-4 can be rearranged with rearrangement of subchannels in the shuttle network of stacked switch module 320 with the rearranged subchannels assigned to superchannels from WSSs 322-1, . . . 322-4. For example, one subchannel to each of WSSs 322-1, . . . 322-4 can repacked to WSS 324-1. To reduce the frequency used on each fiber, the subchannels at each fiber can be as close as possible to form another superchannel with minimal frequency required.

Figure 4:
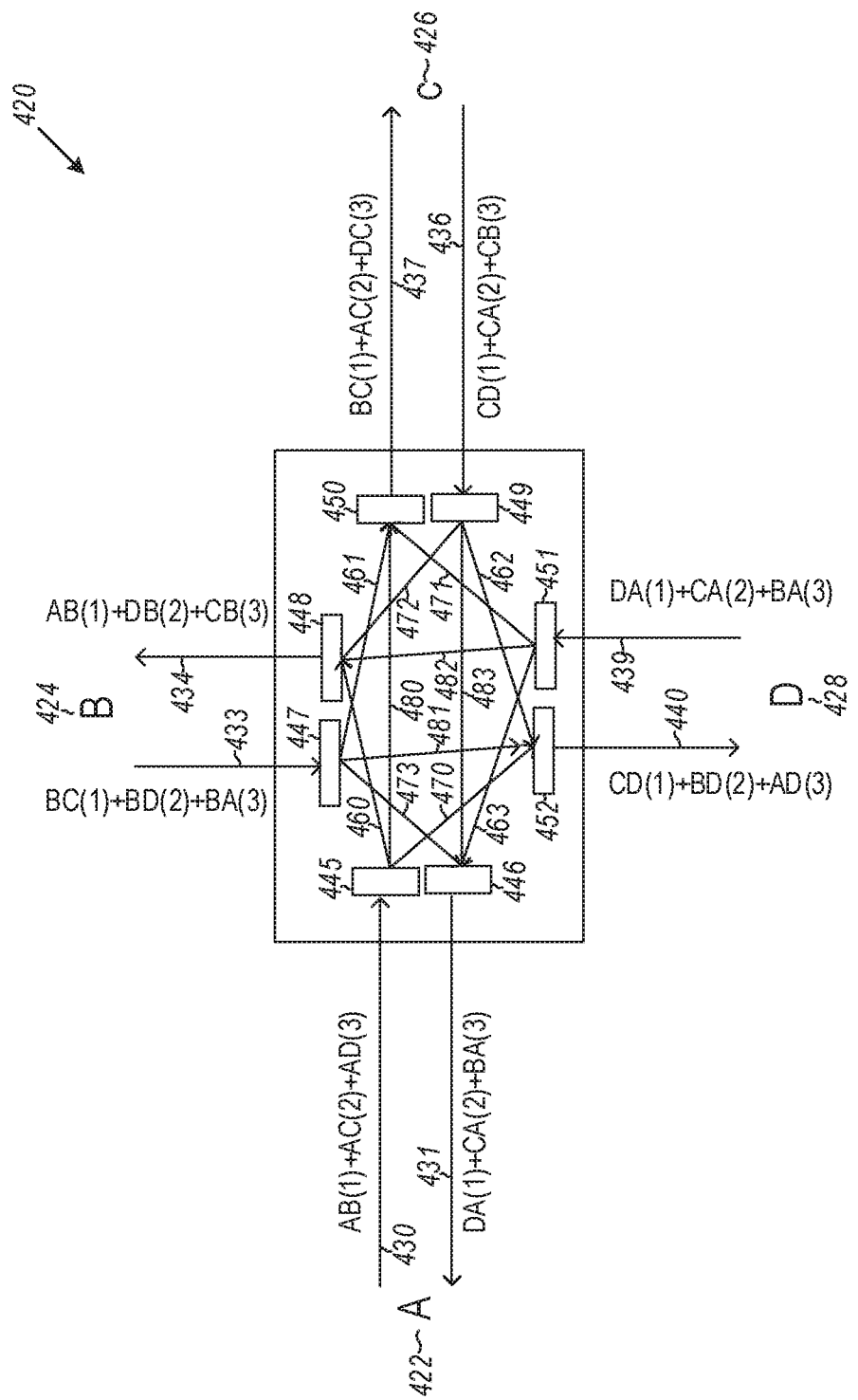
FIG. 4 illustrates an all optical wavelength selective switch for implementation of the network in the disclosed example embodiments.

FIG. 4 illustrates an all optical wavelength selective switch 420 for implementation of the network in the disclosed embodiments. The all optical WSS 420 provides an all optical cross-connect function with single channel granularity, where any WDM or DWDM channel from any of the N inputs can be routed to any of the N outputs. Although a single WSS is depicted 420, it is appreciated that one or more WSSs may be employed in the network. The WSS 420 may be internal to a particular node or external to a node in the network.

WSS 420 as shown in FIG. 4 may be used to connect multiple sites or nodes A at 422, B at 424, C at 426, and D at 428. Node A at 422 is coupled via a transmit superchannel fiber 430 carrying signals intended for other nodes on separate subchannels. An optical superchannel combines multiple optical subcarriers to create a composite optical signal exhibiting a desired capacity. Advantageously, optical superchannel technologies may provide increased capacity sufficient to support the increasing video and mobile traffic demands imposed on networks, such as the Internet.

Fiber 430 is shown as carrying signals from node A to node B on subchannel 1, node A to node C on subchannel 2, and node A to node D on subchannel 3. The subchannels correspond to different wavelengths which may be carried on a given superchannel fiber. The label used to describe the signals on fiber 430 is: AB(1)+AC(2)+AD(3), where AB(1) means traffic from A to B on subchannel 1, and AB(1)+AC(2)+AD(3) means three subchannels 1,2,3 form a superchannel from node A to central node. A receive fiber 431 carries signals from other nodes: DA(1)+CA(2)+BA(3) where DA(1) means traffic from D to A on subchannel 1 and DA(1)+CA(2)+BA(3) means three subchannels 1,2,3 form a superchannel from central node to node A. Node B at 424 includes a transmit fiber 430 and receive fiber 434 with similar labels. Node C at 426 includes a transmit fiber 436 and receive fiber 437 with similar labels. Node D at 428 includes a transmit fiber 439 and receive fiber 440 with similar labels.

The transmit and receive fibers from each node can be coupled to subchannel selective optical switches in the form of optical gratings indicated at 445, 446, 447, 448, 449, 450, 451, and 452 that are capable of directing subchannels to different fibers. Grating 445 for example may be used to direct subchannel 1 to grating 448 as indicated by arrow 460, subchannel 2 to grating 450 as indicated by arrow 480, and subchannel 3 to grating 452 as indicated by arrow 470.

Multiple arrows are used to indicate which subchannels are switched to different gratings and corresponding transmit and receive superchannel fibers. Arrows 460, 461, 462 and 463 correspond to channel 1. Arrows 470, 471, 472, and 473 correspond to channel 3, and arrows 480, 481, 482, and 483 correspond to channel 2. FIG. 4 shows one possible setting of the gratings. The gratings may be controlled to switch the subchannels to from incoming fiber to different outgoing fibers.

Figure 5A:
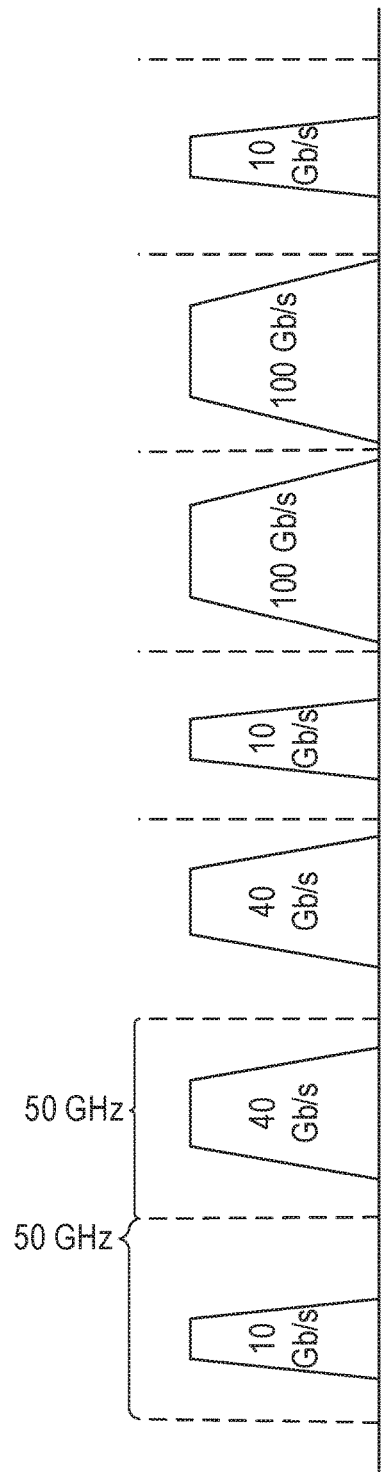
FIGS. 5A and 5B illustrate a fixed grid network and flexible grid network spectrum, respectively.
Figure 5B:
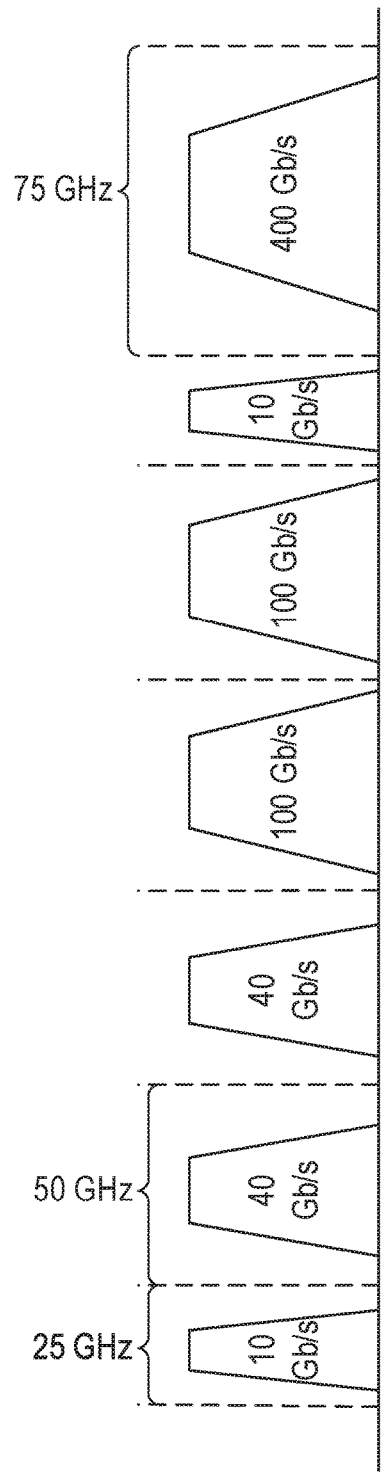

FIGS. 5A and 5B illustrate superchannels based on a fixed-grid and flexible-grid channel bandwidth allocation scheme. A superchannel (or optical superchannel) increases fiber channel capacity in optical networks, i.e. 400 Gb/s or 1 Tb/s per channel, by combining multiple optical subchannels to create a composite optical signal exhibiting a desired capacity. Advantageously, optical superchannel technologies may provide increased capacity sufficient to support the increasing video and mobile traffic demands imposed on networks, such as the Internet.

With reference to FIG. 5A, fixed grid networks comprise a fixed amount of spectrum (e.g., 50 GHz) being allocated to every channel and the center frequency of a channel remains fixed. Such a fixed channel grid may not be sufficient to support the above-noted superchannels which operate at 400 Gbps or 1 Tb/s. For example, 50 GHz of spectrum is not sufficient for 400 Gbps and 1 Tb/s channels which require 75 GHz and 150 GHz of spectrum, respectively.

With reference to FIG. 5, flexible grid (flex-grid) networks remove the fixed channel grid restriction and allow non-uniform and dynamic allocation of spectrum. Channels with finer granularity can be supported by using an Orthogonal Frequency Division Multiplexing (OFDM) modulation scheme with variable subchannel assignment. Such channels are referred to as flexible channels. For example, the flexible grid can allocate spectrum into a number of different (i.e., flexible) amounts (e.g., 10 GHz, 40 GHz, 100 GHz, 400 GHz) for every channel.

Figure 6A:
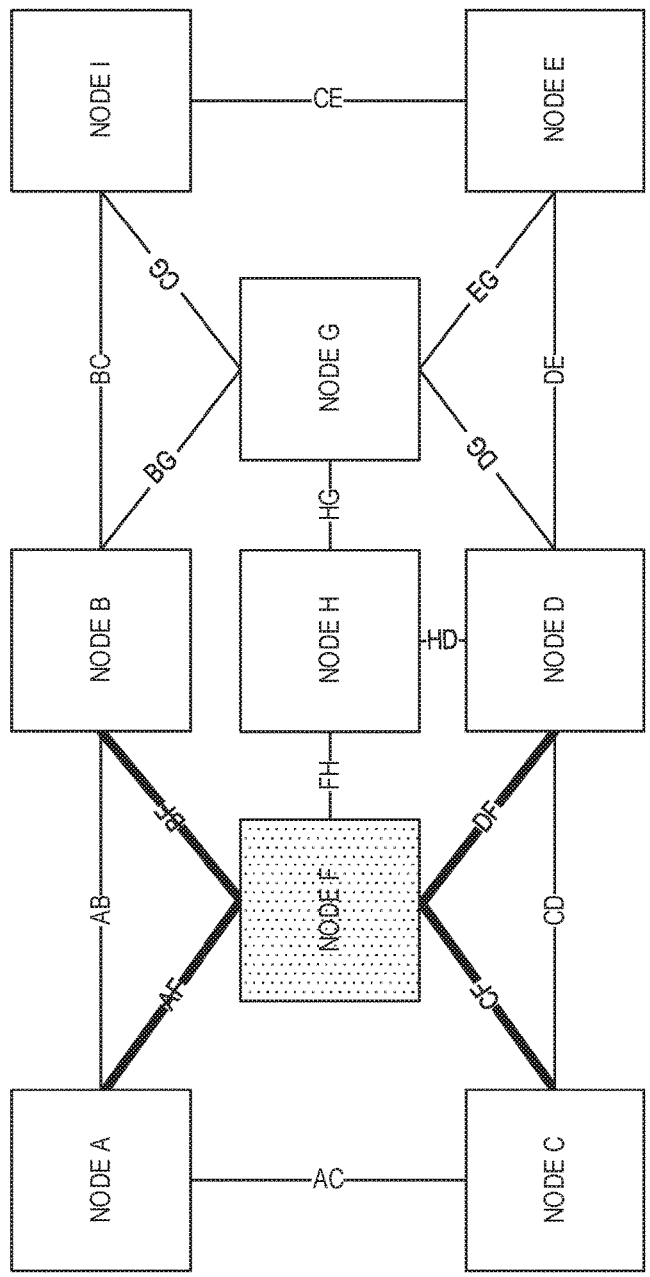
FIGS. 6A, 6B and 6C illustrate an example optical communication network with a central node and superchannels.
Figure 6B:
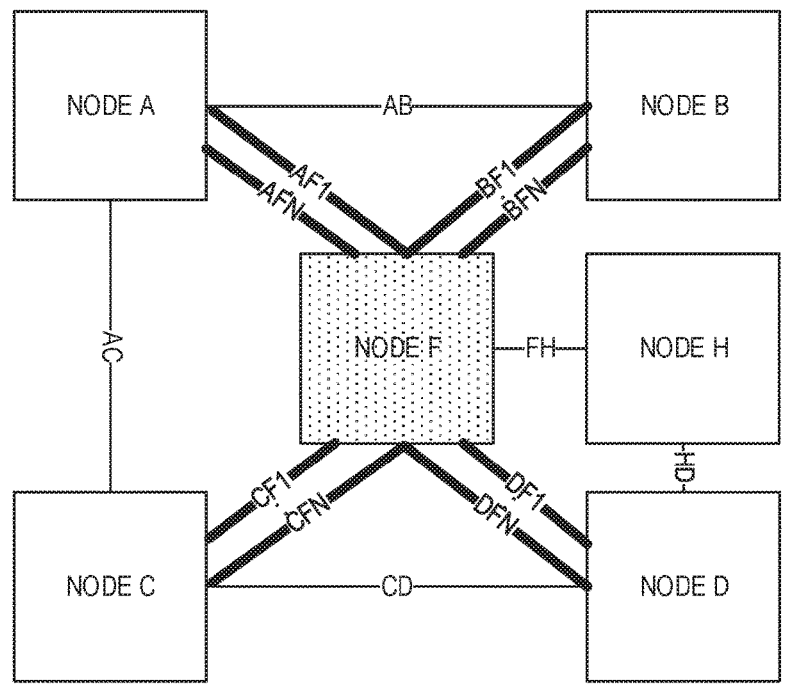
Figure 6C:
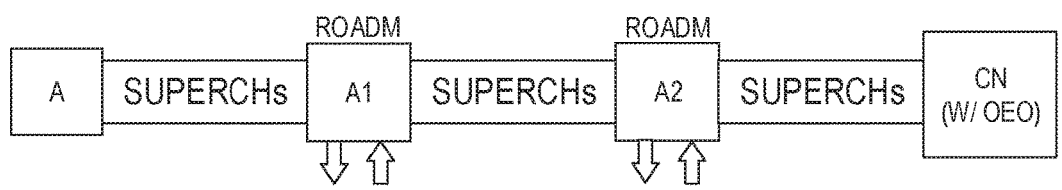

FIGS. 6A, 6B and 6C are example optical communication network diagrams with a central node and a plurality of superchannels. As illustrated, the example optical communication network 100 (e.g., service provider network) includes a network of nine (9) nodes A-H, where each node is connected to one or more other nodes via a respective one of seventeen (17) optical links (similar to the links described above with reference to FIG. 1).

For purposes of discussion, let us assume that a customer of the service provider has four (4) sites represented by nodes A, B, C, and D, where each site has a total incoming and outgoing traffic maximum of 300 Gbps. The customer network (nodes A, B, C and D) is connected to central node F via four (4) superchannels AF, BF, CF and DF.

In one embodiment, there may be one or more superchannels between the customer network nodes A, B, C and D and the central node F. In one example, each superchannel is a point-to-point link with flexible grid ROADMs, as shown in FIG. 6B.

In another embodiment, as illustrated in FIG. 6C, the connection between a given node (A), such as nodes A, B, C and D in FIG. 6A, and the central node (CN), such as central node F in FIG. 6A, is a point-to-point flexible-grid connection with multiple intermediate nodes (e.g., A1 and A2). Each of the intermediate nodes may include a flexible ROADM that can drop a plurality of superchannels and add another plurality of superchannels.

During implementation, traffic between any two nodes in the customer network could be in any pattern, as long as the total maximum bandwidth (in this example, 300 Gbps) is not exceeded. That is, the total bandwidth between the four optical links in the customer network may not exceed the total bandwidth of the superchannel. For example, a traffic pattern may be represented by any one of the following traffic matrices: pattern 1 matrix (most uniform distribution), pattern 2 matrix (most non-uniform distribution), and pattern 3 matrix (a random distribution). It is appreciated that the illustrated traffic matrices are non-limiting and intended to be examples of traffic patterns.

The efficiency of a central node topology is evident from the number of optical links (i.e., superchannels) that are formed between the nodes A, B, C, and D in the customer network when compared, for example, to a conventional full mesh topology network. In a full mesh topology network, in which each node is connected directly to each of the others, six (6) optical links are required in order to handle the maximum traffic load of 300 Gbps. In contrast, if a central node topology network is employed, in which each of the customer network nodes A, B, C and D are connected to a central node F, only four (4) optical links are necessary. The total number of optical links (i e, superchannels) is changed from quadratic order to linear order of number of nodes.

In one embodiment, the customer network may also comprise a virtual private network (VPN) in which a hose model is employed. A hose traffic model means each node is able to send/receive dynamic amount of traffic to/from any other nodes, where the total sending/receiving traffic is bounded. Applying the hose model to the optical communication network 100, one VPN endpoint (i.e., node) can communicate with additional VPN endpoints (i.e., other nodes) through a single connection (e.g. optical link), where each VPN endpoint specifies its aggregate ingress and egress bandwidth requests. The ingress bandwidth for a VPN endpoint specifies the incoming traffic from all of the other VPN endpoints into the VPN endpoint, while the egress bandwidth is the amount of traffic the VPN endpoint can send to the other VPN endpoints.

The hose model is scalable since the customer manages the allocated bandwidth at per flow basis at the network edge while the VPN provider, which sets up the network, is concerned with the flow aggregates inside the network. See, for example, N. Duffield et al., "A flexible model for resource management in virtual private networks," in Proc. ACM SIGCOMM, 1998, pp. 95-108.

In an optical network, such as optical communication network 100, an optical channel will occupy fiber capacity even if there is no traffic in the optical channel. Thus, in a full mesh topology network for a multi-site VPN in a comprehensive optical network is not economically feasible. Instead, a central node may be selected and superchannels formed between each node A, B, C and D and the central node F. The central node F provides high data rate switching, using for example the WSS 302 in FIGS. 3 and 4, thereby transforming the superchannel non-applicable application to a superchannel applicable application, i.e. the bandwidth between any two nodes may not qualify for a superchannel, but the combined bandwidth from one node to each of the other nodes is large enough for a superchannel. Furthermore, the hose model traffic constraints ensure that the superchannel size can be fixed even though the traffic flowing therein may be dynamic.

Central node F may be selected in a conventional manner. While any number of algorithms may be employed to determine a central node (based on distance, cost, etc.), in one embodiment, the central node F may be selected based on minimal cost, or may already have been selected.

In one example embodiment, the nodes may be referred to as sites, such as customer sites. Each site has at most a 300 Gb per second constraint. The Gbps constraint may be higher in further examples. A traffic matrix may be uncertain, and the central node, F has all optical switching capability. The switching capability in one embodiment enables no spectrum change during switching for transparent optical cross connect (OXC). Any incoming spectrum to be switched to any outgoing fiber with the same spectrum to reach any other node. One constraint includes that any two incoming spectra with overlap should not be switched to the same outgoing fiber to avoid contention. Each site has a group of transmit (Tx)/receive (Rx) functions forming a superchannel when connected to two different fibers. In other words, separate fibers are used for transmitting and receiving signals at each site.

Figure 7:
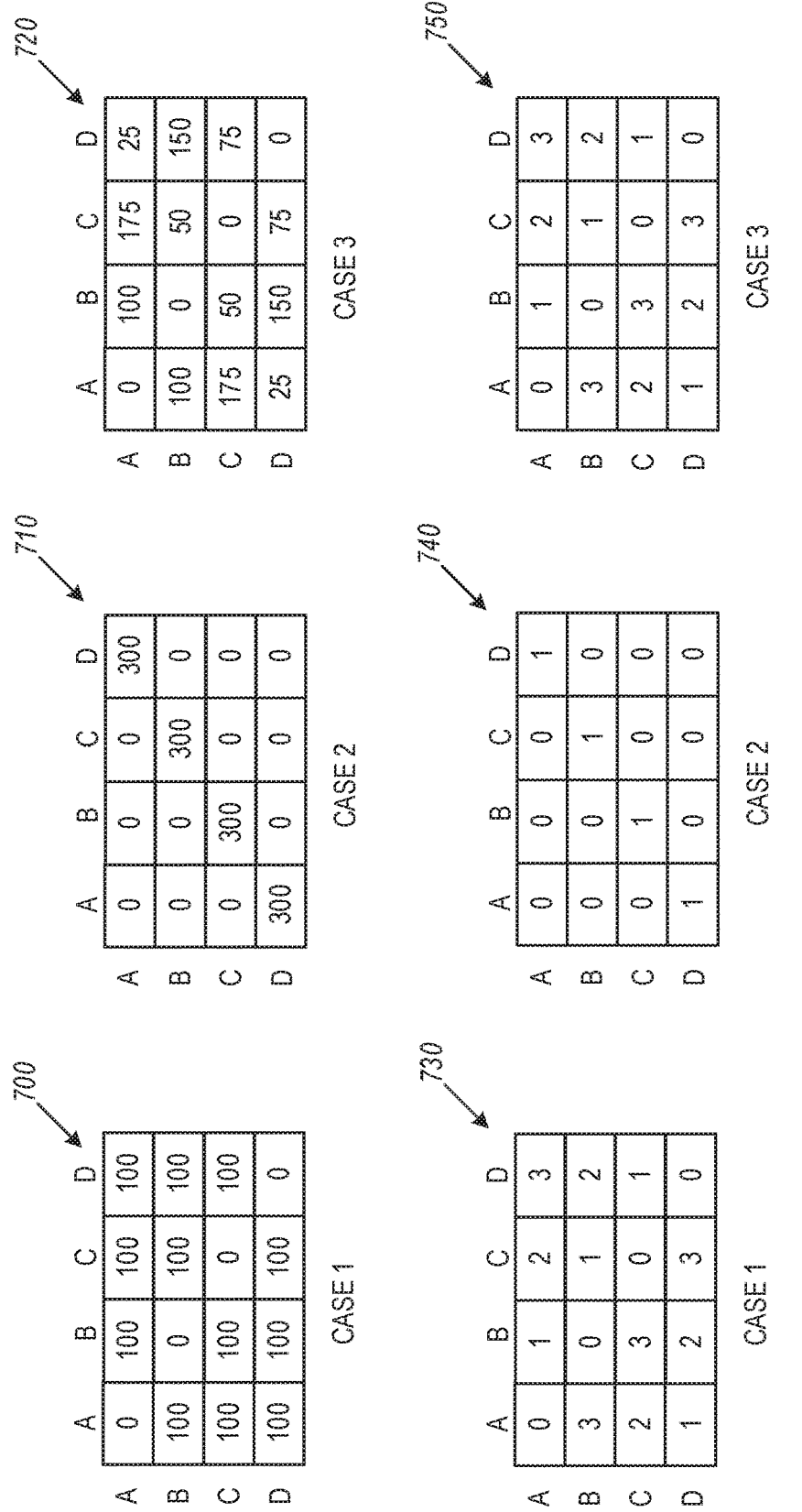
FIG. 7 illustrates a consistent superchannel subchannel code assignment scheme to various example spectrum traffic matrix requirements such that all-optical subchannel switching at the central node without subchannel spectrum contention.

FIG. 7 illustrates various spectrum assignment examples and corresponding subchannels used at the spectrum assignments. Traffic patterns for three different cases, case 1 at matrix 700, case 2 at matrix 710, and case 3 at matrix 720 are shown. Traffic between any two nodes in the customer network could be in any pattern, as long as the total maximum bandwidth (in this example, 300 Gbps) is not exceeded. That is, the total bandwidth between the four optical links in the customer network may not exceed the total bandwidth of the superchannel.

As above, the customer network (nodes A, B, C and D) is connected to optical switching central node F via four (4) superchannels AF, BF, CF and DF. In case 1 at matrix 700, the traffic between each node is equal at 100 Gbps. In case 2 at matrix 710, the traffic between D-A is 300, C-B is 300, B-C is 300, and A-D is 300, with all other traffic being zero. In case 3 at matrix 720, the traffic varies between 25 and 175, but sums to 300 in each row and column, as it does in cases 1 and 2.

Matrices illustrating subchannel assignments inside a superchannel at a given spectral assignment for each case 1, 2, and 3 are shown respectively at 730, 740, and 750. Each number in the matrices denotes the subchannel. Different subchannels do not overlap spectrally. A subchannel index spectrum indicates a maximum spectrum of each data rate spectrum of the index location. Different subchannels inside a superchannel may have different data rates and formats. The same index subchannels in different superchannels may have different data rates and formats. Note that the subchannel assignments are shifted to the right in each succeeding row. For example, in matrix 730, the assignments are 0123 in row A, 3012 in row B, 2301 in row C, and 1230 in row D. In matrix 740, the assignments are shifted to the left in each succeeding row. Shifting assignments between rows helps avoid contention.

Figure 8:
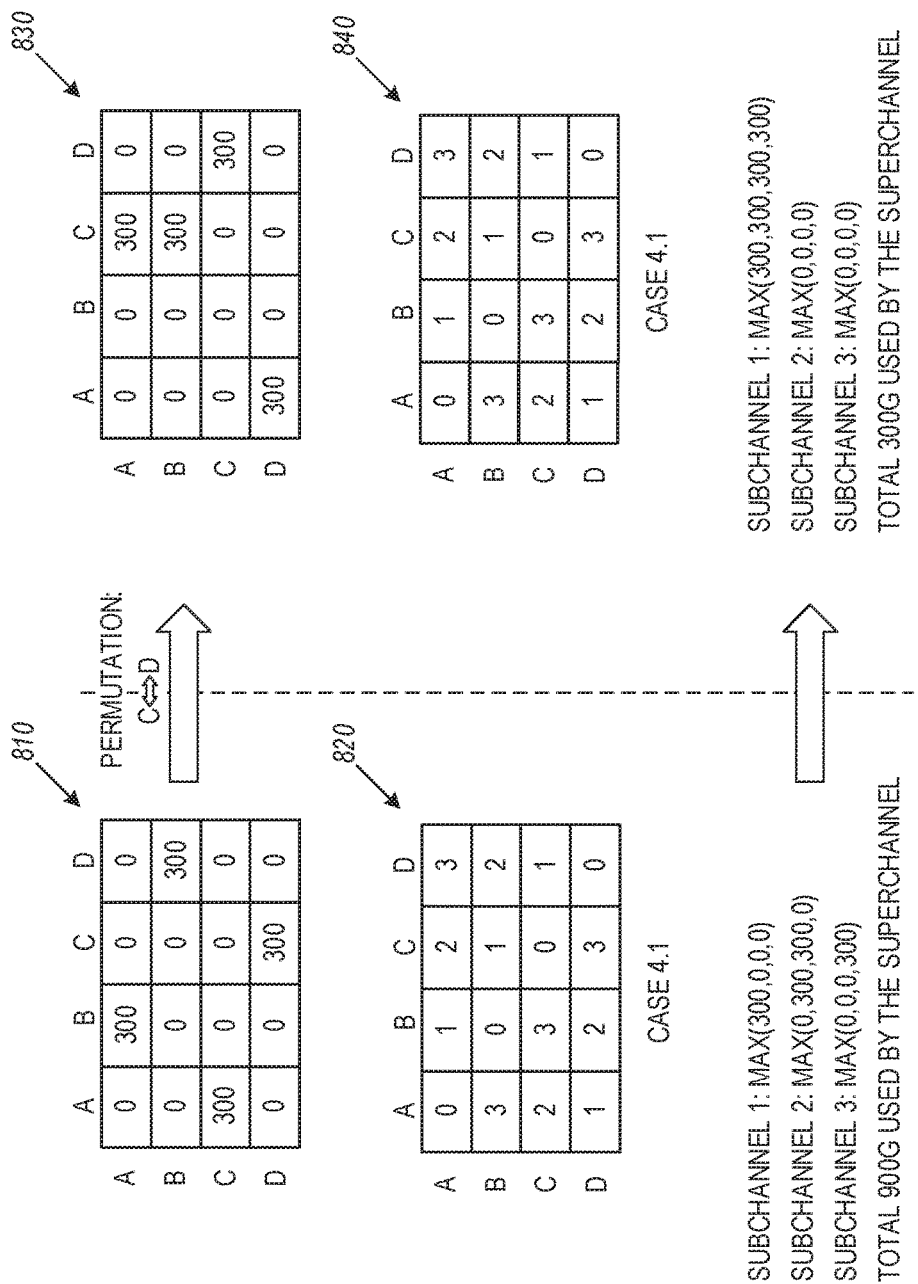
FIG. 8 illustrates that swapping nodes ordering in traffic matrix is able to reduce the total superchannel spectrum requirement according to an example embodiment.

FIG. 8 illustrates further spectrum assignment examples and corresponding subchannels used at the spectrum assignments. In a case 4.1 illustrated by matrices 810 and 820, subchannel 1 can be seen to carry a maximum for the various nodes of max(300,0,0,0), subchannel 2—max(0,300,300,0), and subchannel 3—max(0,0,0,300), for a total of 900 Gbps used by the superchannel. Note that the subchannels indicated in matrix 820 match with the Gbps identified in 810 to derive the maximums.

By permuting node C and node D, the matrices 830 and 840 are obtained. Note that nodes C and D can be switched or permuted by simply changing their indexes, or changing a traffic location table. The permutation may be a logical permutation as opposed to a physical permutation, allowing the use of the network without changing a physical configuration of the network.

The permutation of nodes C and D in case 4.1 allows all the traffic to be carried on subchannel 1 with max(300,300, 300,300), such that a total of only 300 Gps is used by the superchannel. This is a significant reduction from the 900 Gps prior to the permutation. One way to determine the best permutation is to test all possible permutations of the network. That may work well for very small networks having less than 10 nodes, however, beyond that number of nodes, some algorithms described below may be used to obtain a network configuration of nodes that minimizes total network bandwidth utilization.

Figure 9:
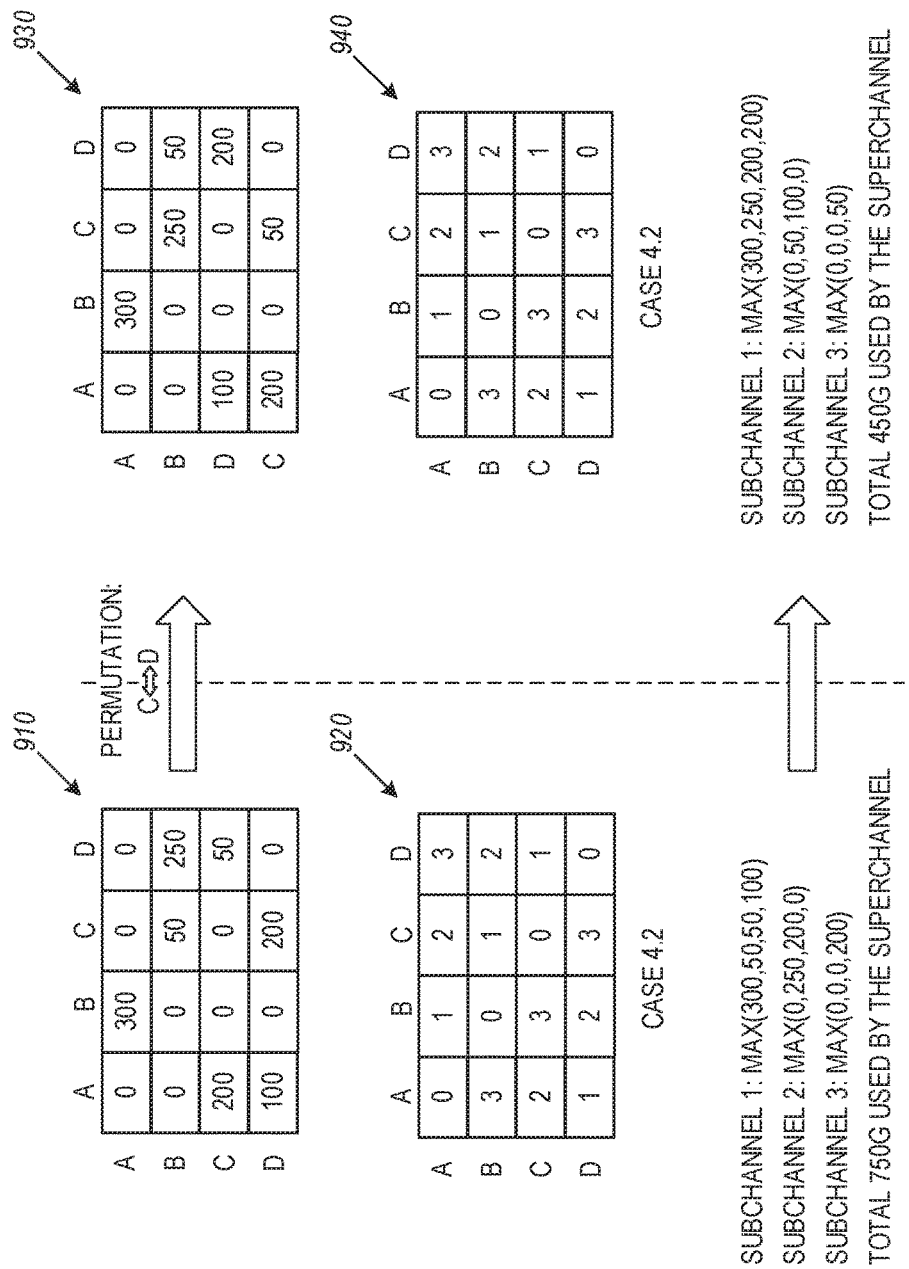
FIG. 9 illustrates further example of benefits of optimizing node ordering in traffic matrix to reduce superchannel spectrum requirement according to an example embodiment.

FIG. 9 illustrates further spectrum assignment examples and corresponding subchannels used at the spectrum assignments. In a case 4.2 illustrated by matrices 910 and 920, subchannel 1 can be seen to carry a maximum for the various nodes of max(300,50,50,0), subchannel 2—max(0,250,200, 0), and subchannel 3—max(0,0,0,200), for a total of 750 Gbps used by the superchannel. Note that the subchannels indicated in matrix 920 match with the Gbps identified in 910 to derive the maximums.

By permuting node C and node D, the matrices 930 and 940 are obtained. The permutation of nodes C and D in case 4.2 allows a more efficient use of the subchannels, with subchannel 1 having max(300,250,200,200), subchannel 2 having max(0,50,100,0) such that a total of only 450G is used by the superchannel. This is a significant reduction from the 750G prior to the permutation.

Figure 10:
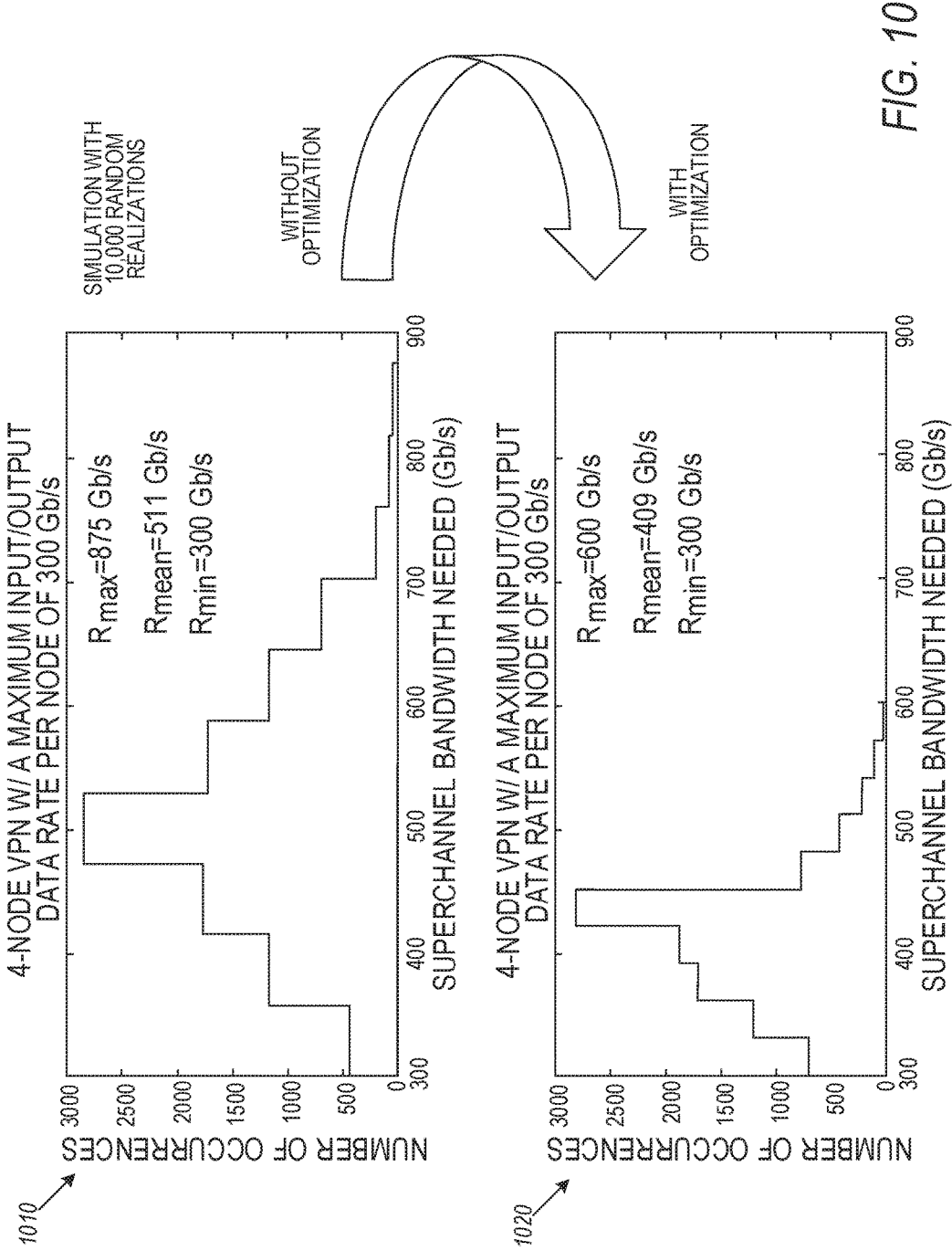
FIG. 10 illustrates histograms without and with optimization obtained from a simulation of a four node VPM with a maximum input/output data rate per node of 300 Gbps according to an example embodiment.

FIG. 10 illustrates histograms 1010 and 1020 obtained from a simulation of a four node VPM with a maximum input/output data rate per node of 300 Gbps. The simulation was performed using 10,000 random realizations. Histogram 1010 illustrates results without optimization of subchannel assignments, resulting in a realization maximum of 875 Gbps, mean of 511 Gbps, and minimum of 300 Gbps. With optimization, histogram 1020 shows a maximum of 600 Gbps, mean of 409 Gbps, and minimum of 300 Gbps. The histograms show that optimization of subchannel assignments can result in significant bandwidth requirement reductions.

Optimization of subchannel assignment may be done in many different ways, including simply generating all permutations and picking the most efficient permutation. In addition, other optimization algorithms may be used, including two described below, and others. To set the stage for the algorithms, the following general formulation may be used.

Figure 11:
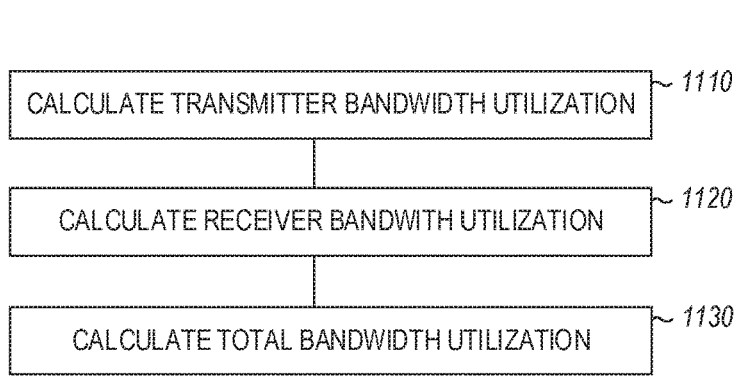
FIG. 11 is a flowchart illustrating one method of determining total superchannel bandwidth according to an example embodiment.

FIG. 11 is a flowchart illustrating one method 1100 determining total superchannel bandwidth. A VPN network has n sites, V0, ..., Vn−1 with traffic matrix M=[m(i,j)] traffic from Vi to Vj. Let the bandwidth of the $j^{th}$ subchannel be: y[j]=max (m(0, j), m(1, j+1), ..., m(n, (j+n) % n), j=0, ..., n−1. The "%" notation corresponds to mode by n, the remainder after dividing by n.

The total superchannel bandwidth is: $B_{total}$=sum of y[j] for the transmitter and receiver. The transmitter bandwidth may be calculated at 1110 where site k: place m(k,j) traffic to slot y[(j−k) % n], where k is a site index. The receiver may be calculated at 1120 where site k: get m(j,k) traffic from slot y[(k−j) % n]. The total superchannel bandwidth is then calculated as a sum of the transmitter and receiver bandwidth utilizations at 1130.

Figure 12:
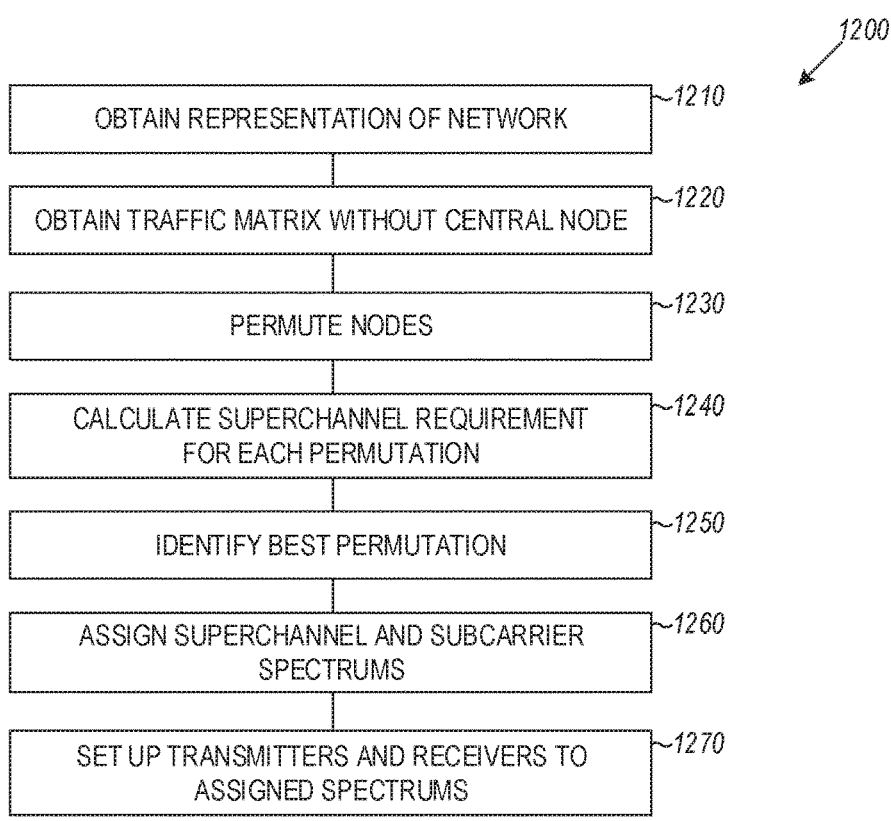
FIG. 12 is a flowchart illustrating a method of implementing an ILP algorithm to optimize subchannel assignments according to an example embodiment.

FIG. 12 is a flowchart illustrating a method 1200 of general subchannel spectrum coding and spectrum assignment such that all-optical switching is done without contention. Method 1200 is a general spectrum coding assignment scheme on how to assign subchannel spectrum on Vk for traffic to Vj, and how to receive subchannel spectrum on Vk for traffic from Vj. The total superchannel spectrum is (y[1], y[2], ..., y[n]] with bandwidth $B_{total}$. In one embodiment, a representation of a star network is obtained at 1210. A traffic matrix without central node is then obtained at 1220. At 1230, the method permutes the non-central nodes. The permutations can be generated offline since the set of VPN nodes are input information that can be used by a processor and stored instructions providing an algorithm to conduct the permutations. At 1240, a superchannel spectrum requirement is calculated for each permutation using method 1100.

A permutation with minimal superchannel spectrum requirement is identified at 1250. According to the coding assignment scheme, subchannel spectrum and superchannel spectrum are assigned at 1260. At 1270, commands are sent to superchannel transmitter/receivers to tune to the right spectrum for communication.

An optimization question is how to rearrange ("permute") the n sites such that $B_{total}$ is an minimized. Two of my algorithms that may be used include an Integer Linear Programming (ILP) algorithm (to simplify the permutation calculation); and/or a Heuristic algorithm (for very large n).

Figure 13:
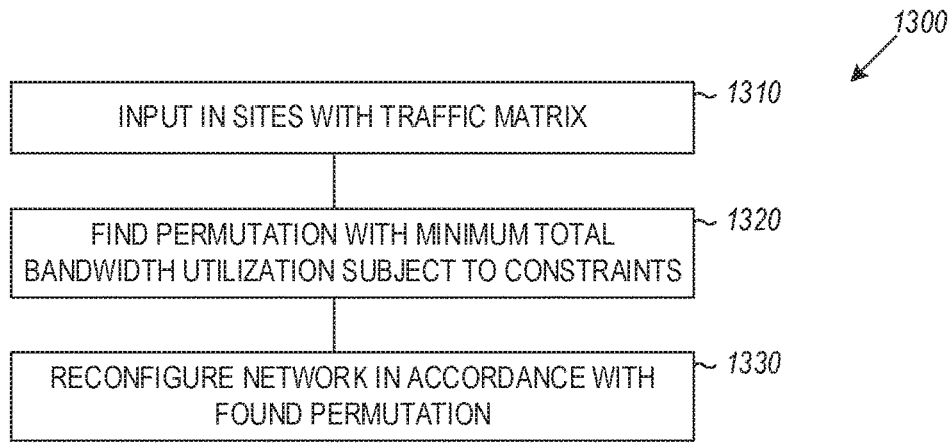
FIG. 13 is a flowchart illustrating a method of implementing a heuristic algorithm to optimize subchannel assignments according to an example embodiment.

The ILP algorithm is illustrated in flowchart form in FIG. 13 at 1300 and has inputs 1310 of n sites with traffic matrix, and variables $X[k,i]=1$ if k site is in position of i, else 0, and $Y[j]$: the maximal bandwidth for $j^{th}$ subchannel. An objective function may then be performed at 1320 to find the permutation with the minimum total bandwidth utilization: Min $\Sigma_j Y[j]$ where $j=0, \ldots, n-1$, subject to the following constraints:

$$\Sigma_k x[k,l]=1 \quad (1),$$

$$\Sigma_l x[k,l]=1 \quad (2)$$

$$Y[j] \geq \Sigma_k m[i,k]*x[k,(j+i) \% n], i=0,\ldots,n-1. \quad (3)$$

Constraint (1) means each site only on one position; constraint (2) means each position only with one site; constraint (3) calculates the subchannel spectrum requirement according to consistent coding assignment scheme. By summing the maximum bandwidth utilization for each subchannel subject to the constraints, the permutation with the minimum total bandwidth utilization may be found and applied to reconfigure the network in accordance with the permutation at 1330.

Figure 14:
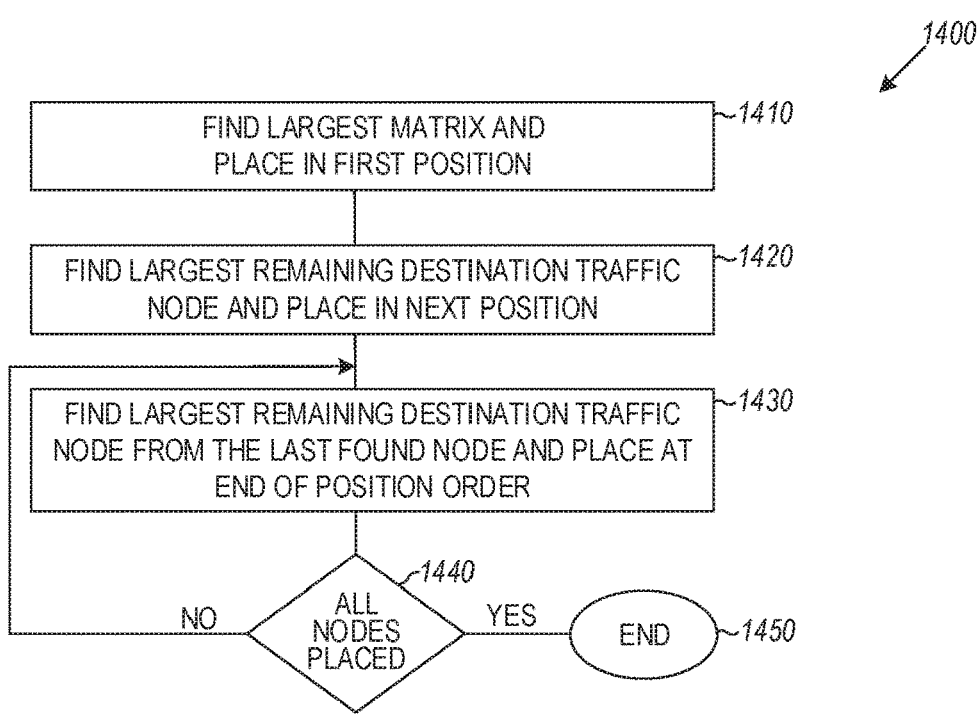
FIG. 14 is a flowchart illustrating a method of subchannel spectrum coding and spectrum assignment such that all-optical switching is performed without contention according to an example embodiment.

FIG. 14 is a flowchart illustrating a method 1400 of implementing the heuristic algorithm to find largest m[i,j] at 1410, say (i0,j0), place i0, j0 on position 0,1. Then at 1420, the largest remaining destination traffic node from j0, say j1, place j1 on position 2 is found. At 1430 the largest remaining destination traffic node from last found node is found, and placed at the end of the position order. This is performed until all nodes are placed as indicated at 1440. The scheme of method 1400 can be implemented in an offline tool, which creates the best position order, where the offline tool can include a processor and memory storage including instructions to execute one or more algorithms to perform the scheme. The network may then be configured per the position order and the method ends at 1450.

In summary, all optical switching is used for superchannels under a hose traffic model. An innovative coding assignment scheme includes the use of an algorithm for superchannel subchannel assignment without spectrum contention. Three different optimization schemes to minimize superchannel spectrum requirements are described, including site permutation, ILP modeling, and a heuristic algorithm. Other optimization schemes may be used in further embodiments and can be plugged-into this scheme.

Figure 15:
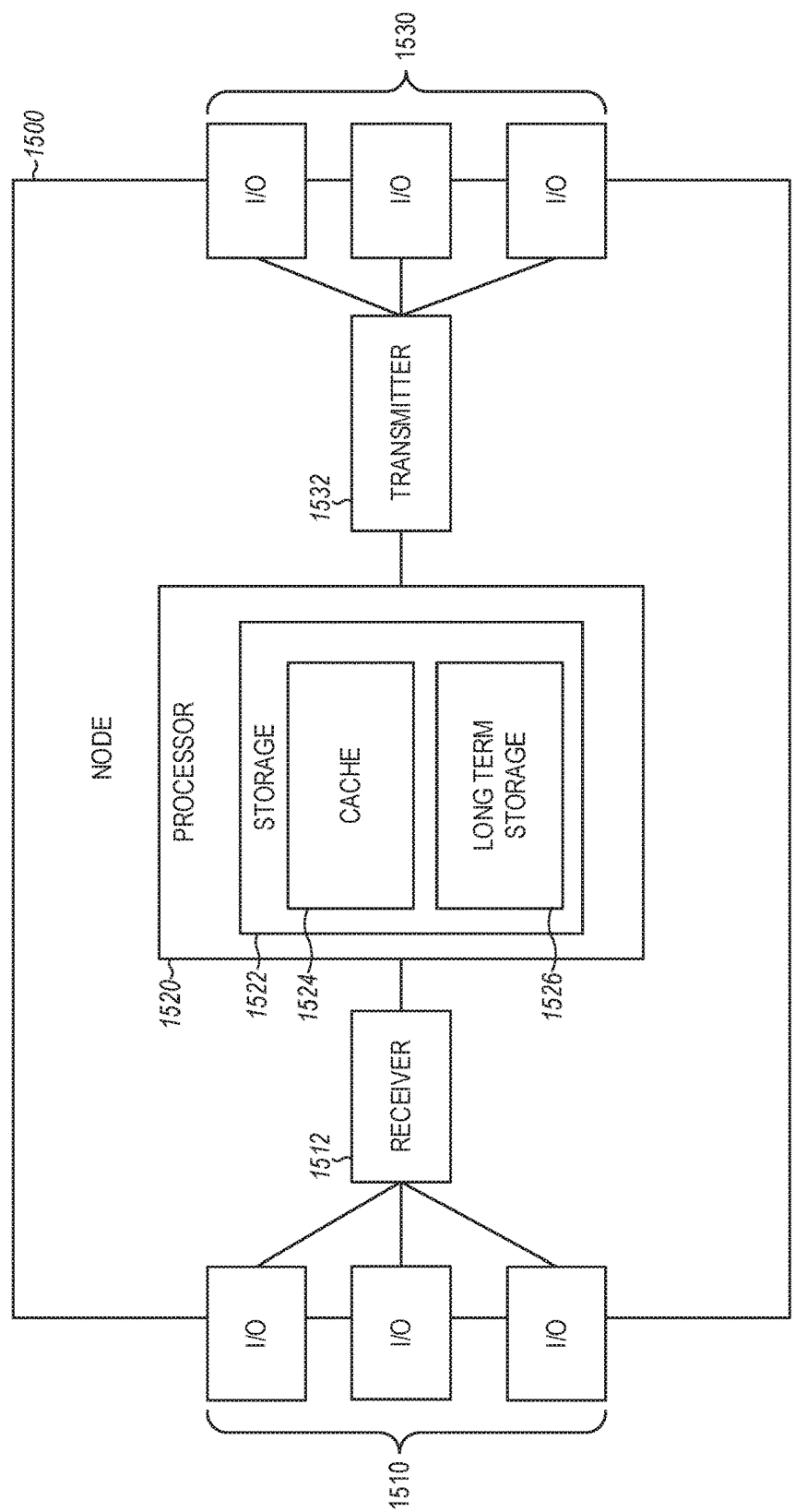
FIG. 15 illustrates an embodiment of a router in accordance with embodiments of the disclosure.

FIG. 15 illustrates an embodiment of a router in accordance with embodiments of the disclosure. The node (e.g., a router) 1500 may be, for example, the node $X_N$ (FIG. 1) or any other node or router as described above in the network. The node 1500 may comprise a plurality of input/output ports 1510/1530 and/or receivers (Rx) 1512 and transmitters (Tx) 1532 for receiving and transmitting data from other nodes, a processing system or processor 1520 (or content aware unit) including a storage 1522, to process data and determine which node to send the data. Although illustrated as a single processor, the processor 1520 is not so limited and may comprise multiple processors. The processor 1520 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1520 may be configured to implement any of the schemes described herein using any one or combination of steps described in the embodiments. Moreover, the processor 1520 may be implemented using hardware, software, or both.

The storage 1522 (or memory) may include cache 1524 and long-term storage 1526, and may be configured to store routing tables, forwarding tables, or other tables or information disclosed herein. Although illustrated as a single storage, storage 1522 may be implemented as a combination of read only memory (ROM), random access memory (RAM), or secondary storage (e.g., one or more disk drives or tape drives used for non-volatile storage of data).

Figure 16:
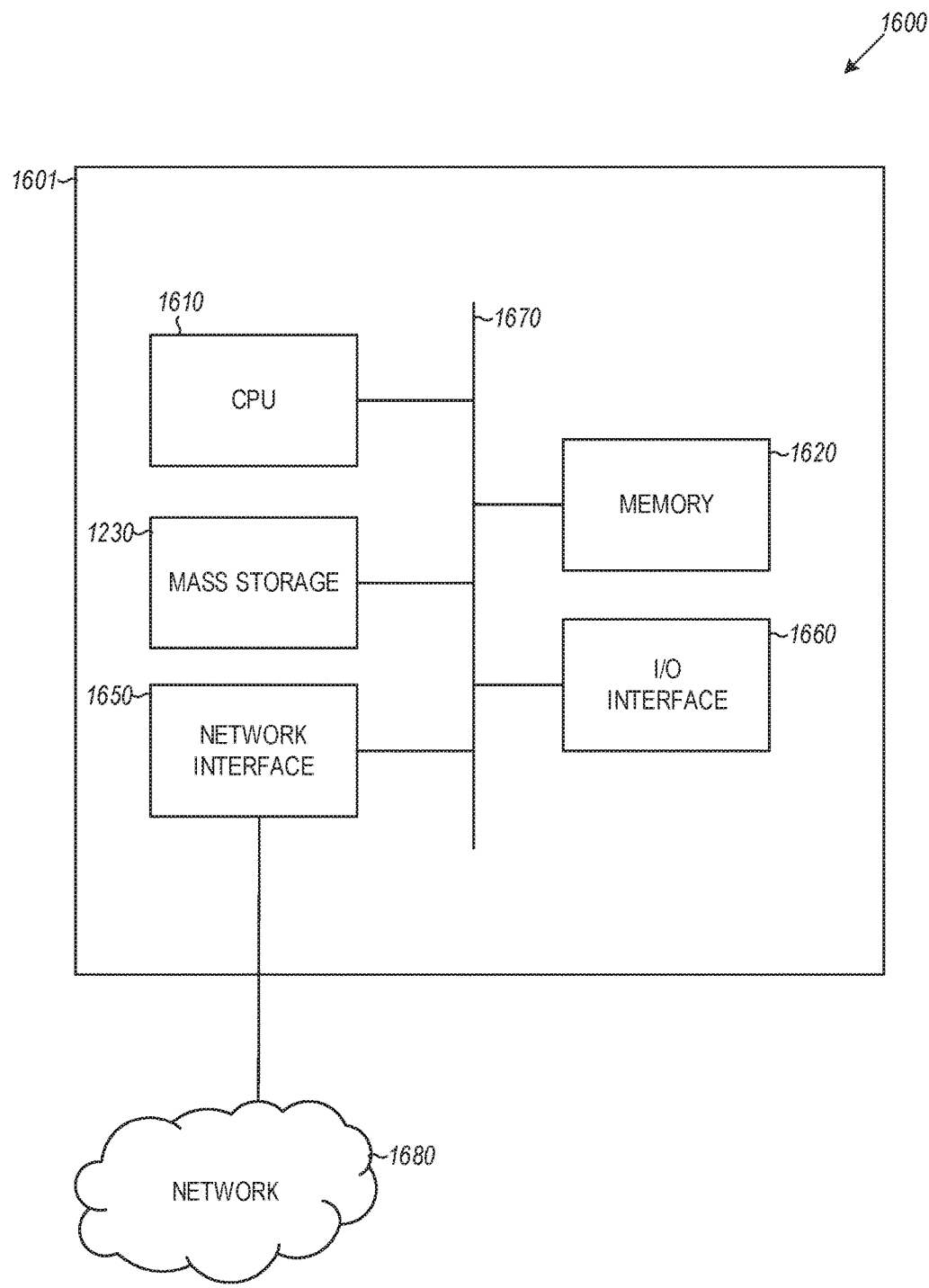
FIG. 16 illustrates a block diagram of a network system that can be used to implement various embodiments.

FIG. 16 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1601 equipped with one or more input/output devices, such as network interfaces, storage interfaces, and the like. The processing unit 1601 may include a central processing unit (CPU) 1610, a memory 1620, a mass storage device 1630, and an I/O interface 1660 connected to a bus. The bus may be one or more of any type of several bus architectures including a memory bus or memory controller, a peripheral bus or the like.

The CPU 1610 may comprise any type of electronic data processor. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs. In embodiments, the memory 1620 is non-transitory. The mass storage device 1630 may comprise any type of storage device configured to store data, programs, and other information and to make the data, programs, and other information accessible via the bus. The mass storage device 1630 may comprise, for example, one or more of a solid state drive, hard disk drive, a magnetic disk drive, an optical disk drive, or the like.

The processing unit 1601 also includes one or more network interfaces 1650, which may comprise wired links, such as an Ethernet cable or the like, and/or wireless links to access nodes or one or more networks 1680. The network interface 1650 allows the processing unit 1601 to communicate with remote units via the networks 1680. For example, the network interface 1650 may provide wireless communication via one or more transmitters/transmit antennas and one or more receivers/receive antennas. In an embodiment, the processing unit 1601 is coupled to a local-area network or a wide-area network for data processing and communications with remote devices, such as other processing units, the Internet, remote storage facilities, or the like.

Computer-readable instructions stored on a computer-readable medium are executable by the processors of the nodes. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program may be used to cause a processing unit to perform one or more methods or algorithms described herein.

Figure 17:
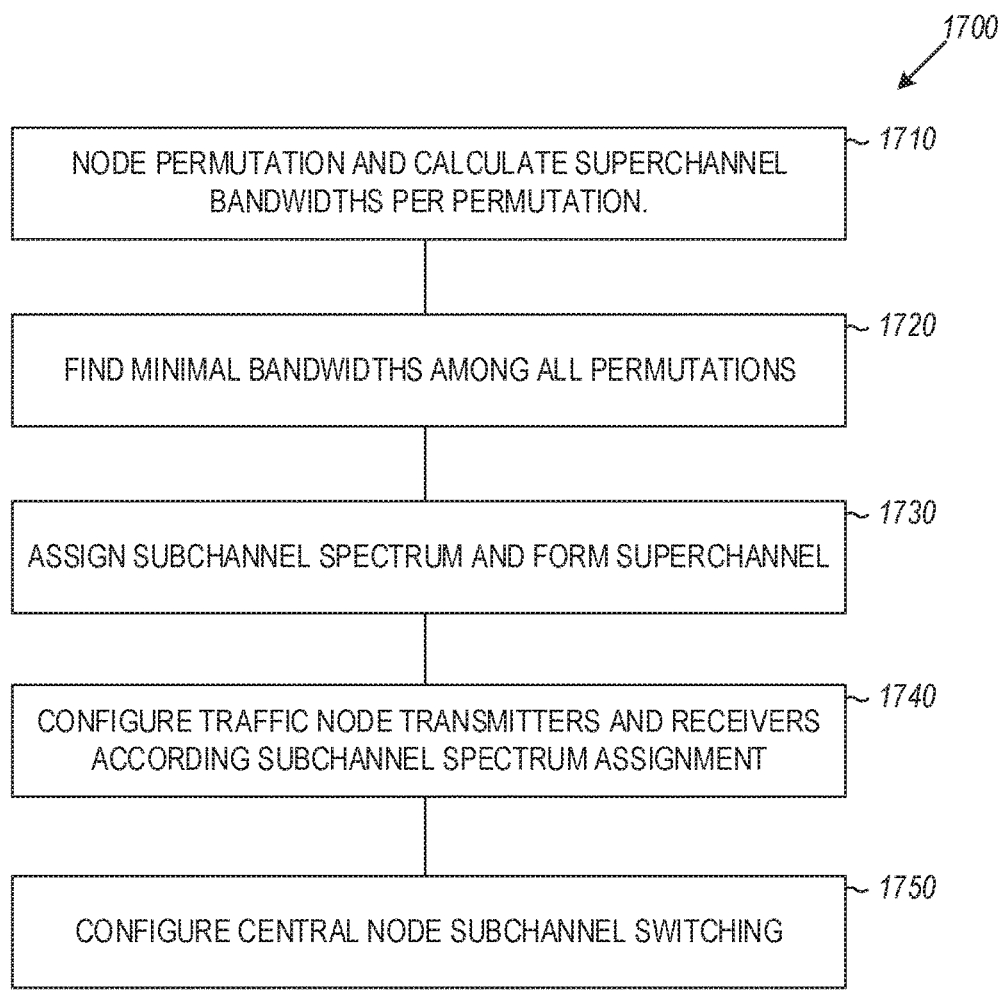
FIG. 17 is a flowchart illustrating an overall method of configuring an optical switching network according to example embodiments.

FIG. 17 is a flowchart illustrating an overall method 1700 of configuring an optical switching network according to example embodiments. At 1710, node permutation is performed and superchannel bandwidths for each permutation are calculated. The permutations are then processed to find minimal bandwidths among all the permutations at 1720. Subchannel spectrum is then assigned at 1730 and a superchannel is formed. Traffic node transmitters and receivers are configured at 1740 according to the subchannel spectrum assignment. At 1750 the central node subchannel switching is configured.

In various embodiments, a method for constructing an optical network can comprise: connecting each of a plurality of nodes in an optical network to an all optical switching central node via a set of optical superchannels, wherein each of the optical superchannels includes of a set of wavelength subchannels and has a bounded data rate, and wherein the all optical switching central node is configured to perform wavelength selective switching among the subchannels of these superchannels at the all optical switching central node. Variations of such a method or similar methods can include a number of different embodiments that may be combined depending on the application of such methods and/or the architecture of systems in which such methods are implemented. The connection between the all optical switching central node and each of the set of nodes can be a flexible-grid WDM connection. Each of the superchannels can include multiple wavelength subchannels with flexible spectrum assignment and modulation. Each of the superchannels can include multiple wavelength subchannels having a same modulation format. The data rate of each of the superchannels can be dynamically allocated to support communication among the plurality of nodes. The plurality of nodes of the optical network can form a virtual private network (VPN). The all optical switching central node can comprise multiple input and output optical fiber ports, coupled to an optical element that performs optical switching among the wavelength subchannels that are within each superchannel. The optical element comprises a flexible-grid wavelength selective switch.

Variations of the above methods or similar methods can include the set of superchannels being given spectral assignments on a subchannel basis according to a coding assignment scheme such that the wavelength selective switching among the subchannels of these superchannels is achieved without spectrum contention. The coding assignment scheme can also minimize the total superchannel bandwidth, $B_{total}$. The total superchannel bandwidth, $B_{total}$, can be defined as $$B_{total} = \text{sum of } y[j],$$

where $y[j]$ is the bandwidth of the j-th subchannel that is defined as $$y[j] = \max(m(0,j), m(1,j+1), \ldots, m(n,(j+n) \% n)),$$
$$j=0, \ldots, n-1,$$

for a star-type network having n sites, $V0, \ldots, Vn-1$ with traffic matrix $M=[m(i,j)]$ traffic from $Vi$ to $Vj$. At a transmitter side, $m(k,j)$ data rate can be assigned to slot $y[(j-k) \% n]$, and at a receiver side, $m(j,k)$ data rate is assigned to slot $y[(k-j) \% n]$ where k is a site index and "%" means the remaining after divided by n. Rearrangement as a permutation of the subchannels of the superchannels connected to the n sites is performed to minimize $B_{total}$. Optimized permutation of nodes from all permutations of the nodes to minimize $B_{total}$ can be obtained by using a heuristic algorithm. The heuristic model can comprise: finding a largest bandwidth utilization matrix and placing the largest bandwidth utilization matrix in a first position of a position order; finding a largest remaining destination traffic node from the last found node and placing the largest remaining destination traffic node in a next position; and finding the largest remaining destination traffic node from the last found node and placing it an end of the position order until all nodes are placed. Optimized permutation of nodes from all permutations of the nodes to minimize $B_{total}$ can be obtained by using an integer linear programming algorithm. The integer linear programming algorithm can comprises: obtaining n sites with traffic matrix and variables $X[k,i]=1$ if k site is in position of i, else 0, and $Y[j]$ being a maximal bandwidth for jth subchannel; performing an objective function to find the permutation with minimum total bandwidth utilization: Min $\Sigma_j Y[j]$ where $j=0, \ldots, n-1$, subject to constraints comprising: $\Sigma_k x[k,l]=1$, $\Sigma_l x[k,l]=1$, and $Y[j] \geq \Sigma_k m[i,k]*x[k,(j+i) \% n]$, $i=0, \ldots, n-1$ where k is a site index and "%" means the remaining after divided by n; summing the maximum bandwidth utilization for each subchannel subject to the constraints; and selecting the permutation with the minimum total bandwidth utilization. The rearrangement as a permutation of the subchannels of the superchannels connected to the n sites can be achieved by changing forwarding tables to reflect the selected permutation.

Variations of the above methods or similar methods can include the all optical switching central node connects at least another plurality of nodes of the optical network via at least another set of superchannels having another data rate. Multiple sets of the superchannels can be assigned spectrum according to a coding assignment scheme such that wavelength switching without spectrum contention is achieved.

In various embodiments, a non-transitory computer-readable medium storing computer instructions for constructing an optical network, that when executed by one or more processors, causes the one or more processors to perform the steps of: connecting each of a plurality of nodes in an optical network to an all optical switching central node via a set of optical superchannels, wherein each of the optical superchannels includes of a set of subchannels and has a bounded data rate; and wherein the all optical switching central node is configured to perform wavelength selective optical switching among the superchannels at the all optical switching central node. The set of superchannels can be given spectral assignments on a subchannel basis according to a coding assignment scheme such that the wavelength selective switching among the subchannels of these superchannels is achieved without spectrum contention. The coding assignment scheme can also minimize the total superchannel bandwidth, $B_{total}$.

In various embodiments, an optical communication network can comprise: a plurality of nodes connected to optical links, and an all optical switching central node among a plurality of nodes in the optical communication network, wherein a set of nodes from the plurality of nodes is coupled to the all optical switching central node via a corresponding set of superchannels, wherein each of the superchannels includes a set of wavelength separated subchannels and wherein the all optical switching central node is configured to perform wavelength selective switching among the superchannels on a subchannel basis. Variations of such an optical communication network or similar optical communication networks can include a number of different embodiments that may be combined depending on the application of such methods and/or the architecture of systems in which such methods are implemented. The wavelength separated subchannels can be coupled via the all optical switching central node based on a minimization of total superchannel bandwidth utilization. The connection between the all optical switching central node and each of the set of nodes is a flexible-grid WDM connection. Each of the superchannels can include multiple wavelength subchannels with flexible spectrum assignment and modulation. Each of the superchannels can include multiple wavelength subchannels having a same modulation format. The plurality of nodes of the optical network can form a virtual private network (VPN). Variations of the above optical communication networks or similar optical communication networks can include the all optical switching central node comprising multiple input and output optical fiber ports, coupled to an optical element that performs optical switching among the wavelength subchannels that are within each superchannel. The optical element can comprise a flexible-grid wavelength selective switch.

Variations of the above optical communication networks or similar optical communication networks can include multiple sets of the superchannels can be assigned spectrum according to a coding assignment scheme such that wavelength switching without spectrum contention is achieved. Each of the superchannels can have has a bounded data rate. The data rate of each of the superchannels can be dynamically allocated to support communication among the plurality of nodes. The set of superchannels can be given spectral assignments on a subchannel basis according to a coding assignment scheme such that the wavelength selective switching among the subchannels of these superchannels can be achieved without spectrum contention. The coding assignment scheme can also minimize the total superchannel bandwidth, $B_{total}$. The total superchannel bandwidth, $B_{total}$, can be defined as $$B_{total} = \text{sum of } y[j],$$

where $y[j]$ is the bandwidth of the j-th subchannel that is defined as $$y[j] = \max(m(0,j), m(1,j+1), \ldots, m(n,(j+n) \% n)),$$
$$j=0, \ldots, n-1,$$

for a star-type network having n sites, V0, . . . , Vn−1 with traffic matrix $M=[m(i,j)]$ traffic from Vi to Vj. At a transmitter side, $m(k,j)$ data rate can be assigned to slot $y[(j-k) \% n]$, and at a receiver side, $m(j,k)$ data rate can be assigned to slot $y[(k-j) \% n]$ where k is a site index and "%" means the remaining after divided by n. Rearrangement as a permutation of the subchannels of the superchannels connected to the n sites can be performed to minimize $B_{total}$. Optimized permutation of nodes from all permutations of the nodes to minimize $B_{total}$ can be obtained by using a heuristic algorithm. The heuristic model can comprise: finding a largest bandwidth utilization matrix and placing the largest bandwidth utilization matrix in a first position of a position order; finding a largest remaining destination traffic node from the last found node and placing the largest remaining destination traffic node in a next position; and finding the largest remaining destination traffic node from the last found node and placing it an end of the position order until all nodes are placed.

Variations of the above optical communication networks or similar optical communication networks can include optimized permutation of nodes from all permutations of the nodes to minimize $B_{total}$ can be obtained by using an integer linear programming algorithm. The integer linear programming algorithm can comprise: obtaining n sites with traffic matrix and variables $X[k,i]=1$ if k site is in position of i, else 0, and $Y[j]$ being a maximal bandwidth for jth subchannel; performing an objective function to find the permutation with minimum total bandwidth utilization: Min $\Sigma_j Y[j]$ where $j=0, \ldots, n-1$, subject to constraints comprising: $\Sigma_k x[k,l]=1$, $\Sigma_l x[k,l]=1$, and $Y[j] \geq \Sigma_k m[i,k] * x[k,(j+i) \% n]$, $i=0, \ldots, n-1$ where k is a site index and "%" means the remaining after divided by n; summing the maximum bandwidth utilization for each subchannel subject to the constraints; and selecting the permutation with the minimum total bandwidth utilization. The rearrangement as a permutation of the subchannels of the superchannels connected to the n sites can be achieved by changing forwarding tables to reflect the selected permutation. The all optical switching central node can connect at least another plurality of nodes of the optical network via at least another set of superchannels having another data rate.

Examples include:

1. A method for constructing an optical network, the method comprising: connecting each of a plurality of nodes in an optical network to an all optical switching central node via a set of optical superchannels, wherein each of the optical superchannels includes of a set of wavelength subchannels and has a bounded data rate; and wherein the all optical switching central node is configured to perform wavelength selective switching among the subchannels of these superchannels at the all optical switching central node.

2. The method of example 1, wherein the connection between the all optical switching central node and each of the set of nodes is a flexible-grid wavelength-division multiplexing (WDM) connection.

3. The method of any of examples 1-2, wherein each of the superchannels includes multiple wavelength subchannels with flexible spectrum assignment and modulation.

4. The method of any of examples 1-3, wherein the data rate of each of the superchannels is dynamically allocated to support communication among the plurality of nodes.

5. The method of any of examples 1-4, wherein the all optical switching central node comprises multiple input and output optical fiber ports, coupled to an optical element that performs optical switching among the wavelength subchannels that are within each superchannel.

6. The method of any of examples 1-5, wherein the set of superchannels are given spectral assignments on a subchannel basis according to a coding assignment scheme such that the wavelength selective switching among the subchannels of these superchannels is achieved without spectrum contention.

7. The method of any of examples 1-6, wherein the coding assignment scheme also minimizes the total superchannel bandwidth, $B_{total}$.

8. The method of any of examples 1-7, wherein the all optical switching central node connects at least another plurality of nodes of the optical network via at least another set of superchannels having another data rate.

9. A non-transitory computer-readable medium storing computer instructions for constructing an optical network, that when executed by one or more processors, causes the one or more processors to perform the steps of: connecting each of a plurality of nodes in an optical network to an all optical switching central node via a set of optical superchannels, wherein each of the optical superchannels includes of a set of subchannels and has a bounded data rate; and wherein the all optical switching central node is configured to perform wavelength selective optical switching among the superchannels at the all optical switching central node.

10. The non-transitory computer-readable medium storing computer instructions for constructing an optical network of example 9, wherein the set of superchannels are given spectral assignments on a subchannel basis according to a coding assignment scheme such that the wavelength selective switching among the subchannels of these superchannels is achieved without spectrum contention.

11. The non-transitory computer-readable medium storing computer instructions for constructing an optical network of any of examples 9-10, wherein the coding assignment scheme also minimizes the total superchannel bandwidth, $B_{total}$.

12. An optical communication network comprises: a plurality of nodes connected to optical links; and an all optical switching central node among a plurality of nodes in the optical communication network; wherein a set of nodes from the plurality of nodes is coupled to the all optical switching central node via a corresponding set of superchannels, wherein each of the superchannels includes a set of wavelength separated subchannels and wherein the all optical switching central node is configured to perform wavelength selective switching among the superchannels on a subchannel basis.

13. The optical communication network of example 12, wherein the wavelength separated subchannels are coupled via the all optical switching central node based on a minimization of total superchannel bandwidth utilization.

14. The optical communication network of any of examples 12-13, wherein each of the superchannels includes multiple wavelength subchannels with flexible spectrum assignment and modulation.

15 The optical communication network of any of examples 12-14, wherein the all optical switching central node comprises multiple input and output optical fiber ports, coupled to an optical element that performs optical switching among the wavelength subchannels that are within each superchannel.

16. The optical communication network of any of examples 12-15, wherein multiple sets of the superchannels are assigned spectrum according to a coding assignment scheme such that wavelength switching without spectrum contention is achieved.

17. The optical communication network of any of examples 12-16, wherein each of the superchannels has a bounded data rate.

18. The optical communication network of any of examples 12-17, wherein the data rate of each of the superchannels is dynamically allocated to support communication among the plurality of nodes.

19. The optical communication network of any of examples 12-18, wherein the set of superchannels are given spectral assignments on a subchannel basis according to a coding assignment scheme such that the wavelength selective switching among the subchannels of these superchannels is achieved without spectrum contention.

20. The optical communication network of any of examples 12-19, wherein the coding assignment scheme also minimizes the total superchannel bandwidth, $B_{total}$.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for constructing an optical network, the method comprising:
   connecting each node of a set of nodes of a plurality of nodes in an optical network to an all optical switching central node via a set of optical superchannels, the optical network having one or more processors in communication with one or more memory storages to execute operations to manage configuration of the optical network and to route and assign spectrum for the set of optical superchannels of the optical network, wherein each of the optical superchannels includes a set of service bandwidth subchannels and each optical superchannel has a bounded data rate, and each node of the set of nodes includes one or more transponders to implement the optical superchannels connected to the node and a processor with associated memory to process the subchannels of the connected optical superchannel and control the one or more transponders to respond to traffic requests; and
   wherein the all optical switching central node is configured with one or more wavelength selective switches to perform spectrum selective switching among the subchannels of these optical superchannels at the all optical switching central node.

2. The method of claim 1, wherein the connection between the all optical switching central node and each node of the set of nodes is an optical superchannel and each of the subchannels of the optical superchannel is a flexible-grid optical network connection.

3. The method of claim 1, wherein each of the optical superchannels includes multiple wavelength subchannels with flexible spectrum assignment and modulation.

4. The method of claim 1, wherein the data rate of each of the optical superchannels is dynamically allocated to support communication among the plurality of nodes.

5. The method of claim 1, wherein the all optical switching central node comprises multiple input and output optical fiber ports, coupled to an optical switch to switch among the flexible-grid subchannels that are within each optical superchannel.

6. The method of claim 1, wherein the set of optical superchannels are given spectral assignments on a subchannel basis according to a coding assignment scheme such that the wavelength selective switching among the subchannels of these optical superchannels is achieved without spectrum contention.

7. The method of claim 6, wherein the coding assignment scheme also minimizes the total superchannel bandwidth, $B_{total}$.

8. The method of claim 1, wherein the all optical switching central node connects at least another plurality of nodes of the optical network via at least another set of optical superchannels having another data rate.

9. A non-transitory computer-readable medium storing computer instructions for constructing an optical network, that when executed by one or more processors, causes the one or more processors to perform the steps of:
   connecting each node of a set of nodes of a plurality of nodes in an optical network to an all optical switching central node via a set of optical superchannels, the computer instructions including execution of operations to manage configuration of the optical network and to route and assign spectrum for the optical superchannels of the optical network, wherein each of the optical superchannels includes a set of subchannels and each optical superchannel has a bounded data rate, and each node of the set of nodes includes one or more transponders to implement the optical superchannels connected to the node and a processor with associated memory to process the subchannels of the connected optical superchannel and control the one or more transponders to respond to traffic requests between the node and other nodes; and wherein the all optical switching central node is configured with one or more wavelength selective switches to perform spectrum selective optical switching among the optical superchannels at the all optical switching central node.

10. The non-transitory computer-readable medium storing computer instructions for constructing an optical network of claim 9, wherein the set of optical superchannels are given spectral assignments on a subchannel basis according to a coding assignment scheme such that the wavelength selective switching among the subchannels of these optical superchannels is achieved without spectrum contention.

11. The non-transitory computer-readable medium storing computer instructions for constructing an optical network of claim 10, wherein the coding assignment scheme also minimizes the total superchannel bandwidth, $B_{total}$.

12. An optical communication network comprising:
a plurality of nodes connected to optical links;
an all optical switching central node among the plurality of nodes in the optical communication network;
a set of nodes from the plurality of nodes coupled to the all optical switching central node via a corresponding set of optical superchannels, wherein each of the optical superchannels includes a set of flexible-grid subchannels and wherein the all optical switching central node is configured with one or more switches to perform spectrum selective switching among the optical superchannels on a subchannel basis, with each node of the set of nodes including one or more transponders to implement the optical superchannels connected to the node and a node processor with associated memory to process the subchannels of the connected optical superchannels and control the one or more transponders to respond to traffic requests;
a memory storage comprising instructions; and
one or more processors in communication with the memory storage, wherein the one or more processors execute the instructions to manage configuration of the optical communication network and to route and assign spectrum for the optical superchannels of the optical communication network.

13. The optical communication network of claim 12, wherein the wavelength separated subchannels are coupled via the all optical switching central node based on a minimization of total superchannel bandwidth utilization.

14. The optical communication network of claim 12, wherein each of the optical superchannels includes multiple wavelength subchannels with flexible spectrum assignment and modulation.

15. The optical communication network of claim 12, wherein the all optical switching central node comprises multiple input and output optical fiber ports, coupled to an optical switch to switch among the flexible-grid subchannels that are within each optical superchannel.

16. The optical communication network of claim 12, wherein multiple sets of the optical superchannels are assigned spectrum according to a coding assignment scheme such that wavelength switching without spectrum contention is achieved.

17. The optical communication network of claim 12, wherein each of the optical superchannels has a bounded data rate.

18. The optical communication network of claim 17, wherein the data rate of each of the optical superchannels is dynamically allocated to support communication among the plurality of nodes.

19. The optical communication network of claim 17, wherein the set of optical superchannels are given spectral assignments on a subchannel basis according to a coding assignment scheme such that the wavelength selective switching among the subchannels of these optical superchannels is achieved without spectrum contention.

20. The optical communication network of claim 19, wherein the coding assignment scheme also minimizes the total superchannel bandwidth, $B_{total}$.

* * * * *